May 7, 1946. A. F. POTT 2,399,890
SEQUENTIALLY CONTROLLED MULTIPLE CLUTCH MECHANISM
Filed March 26, 1940 11 Sheets-Sheet 6

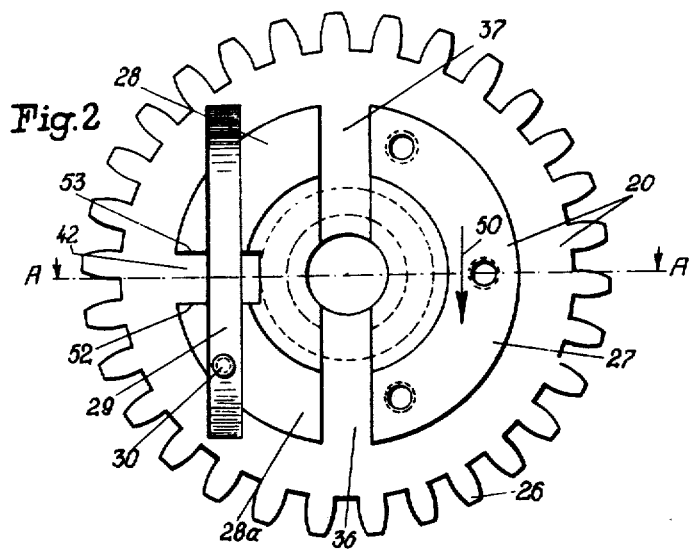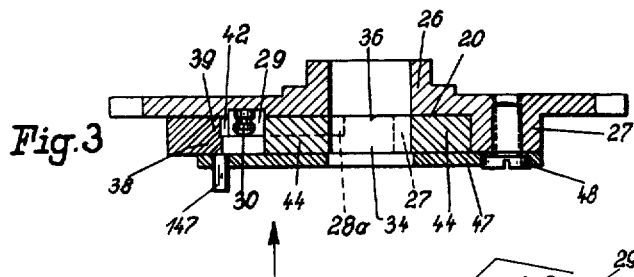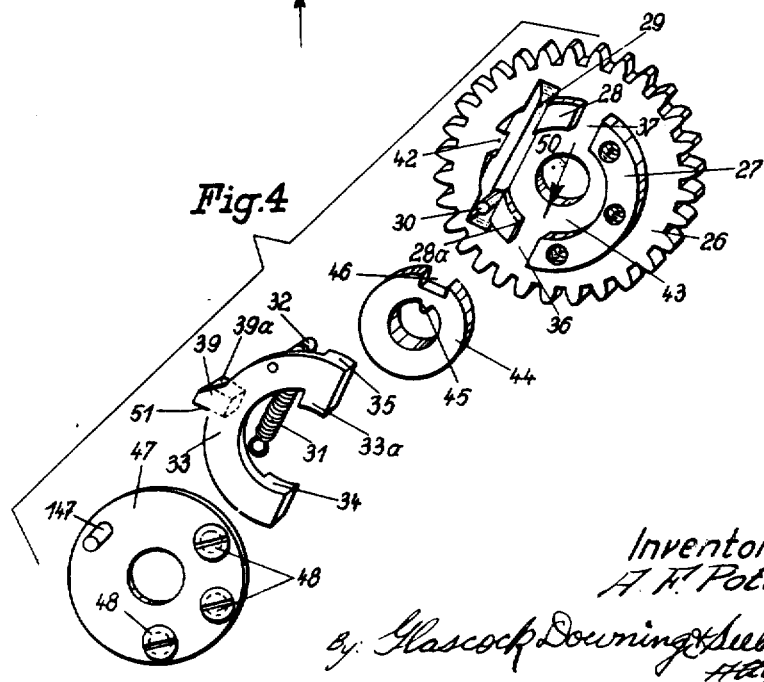

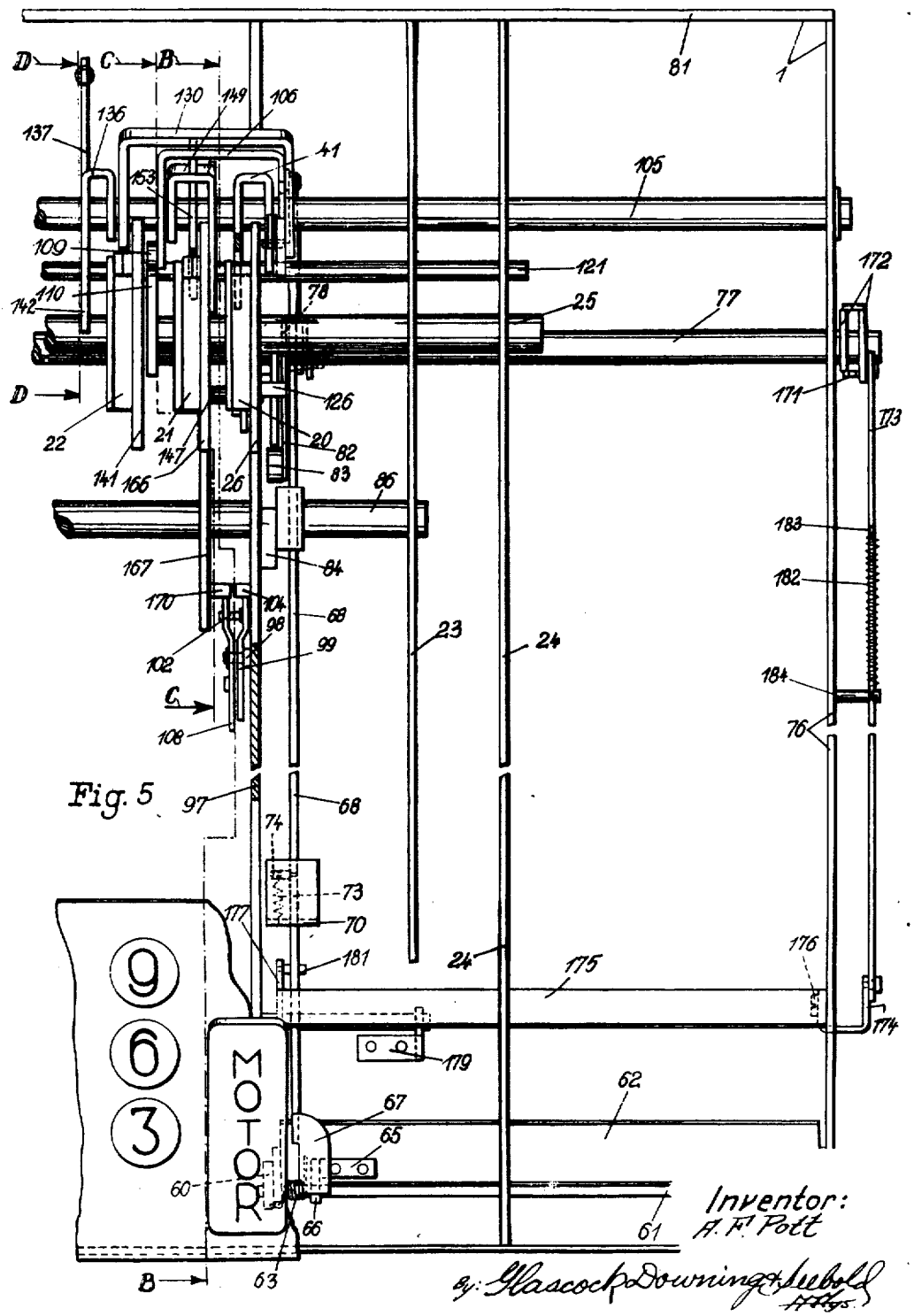

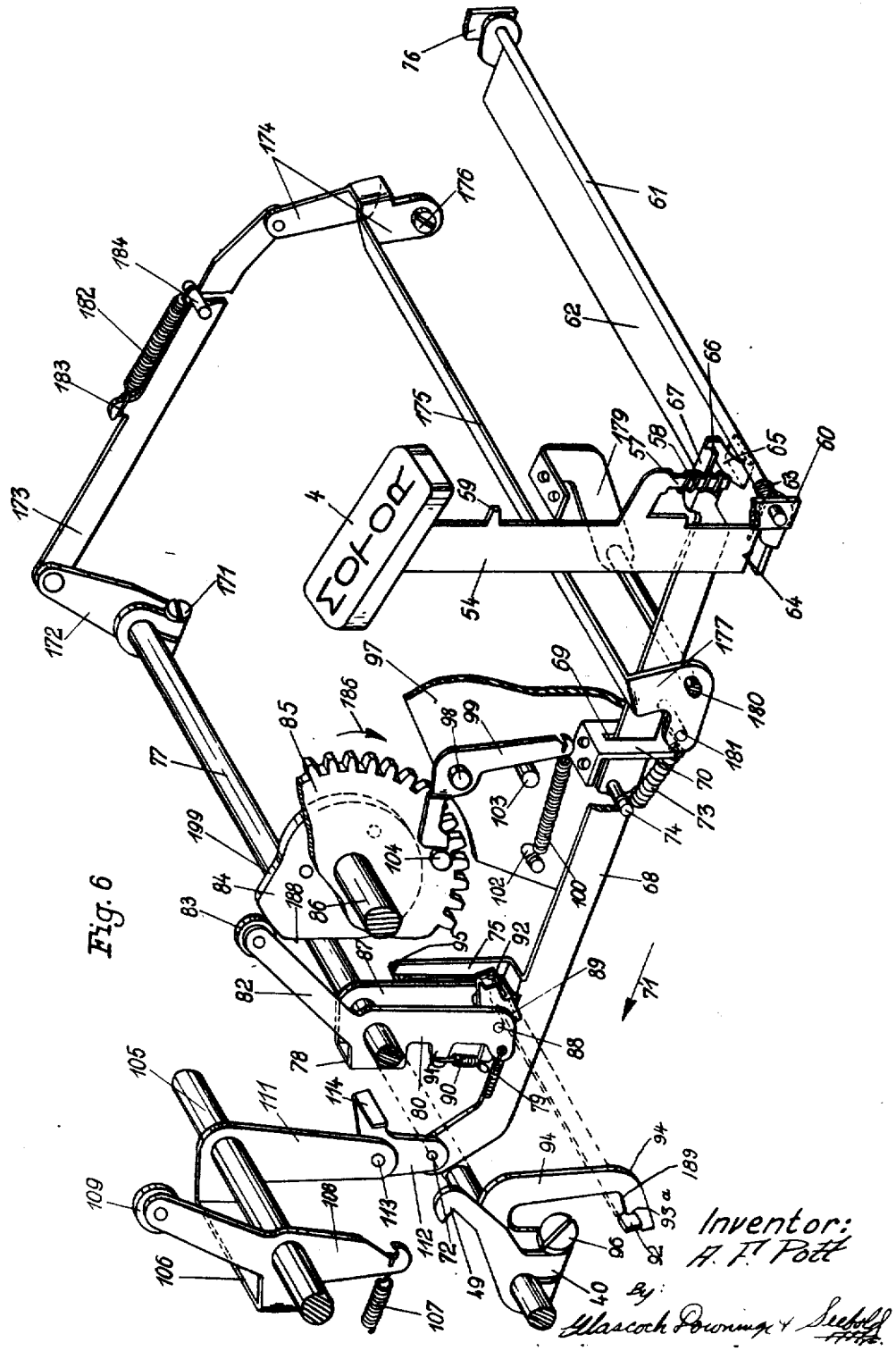

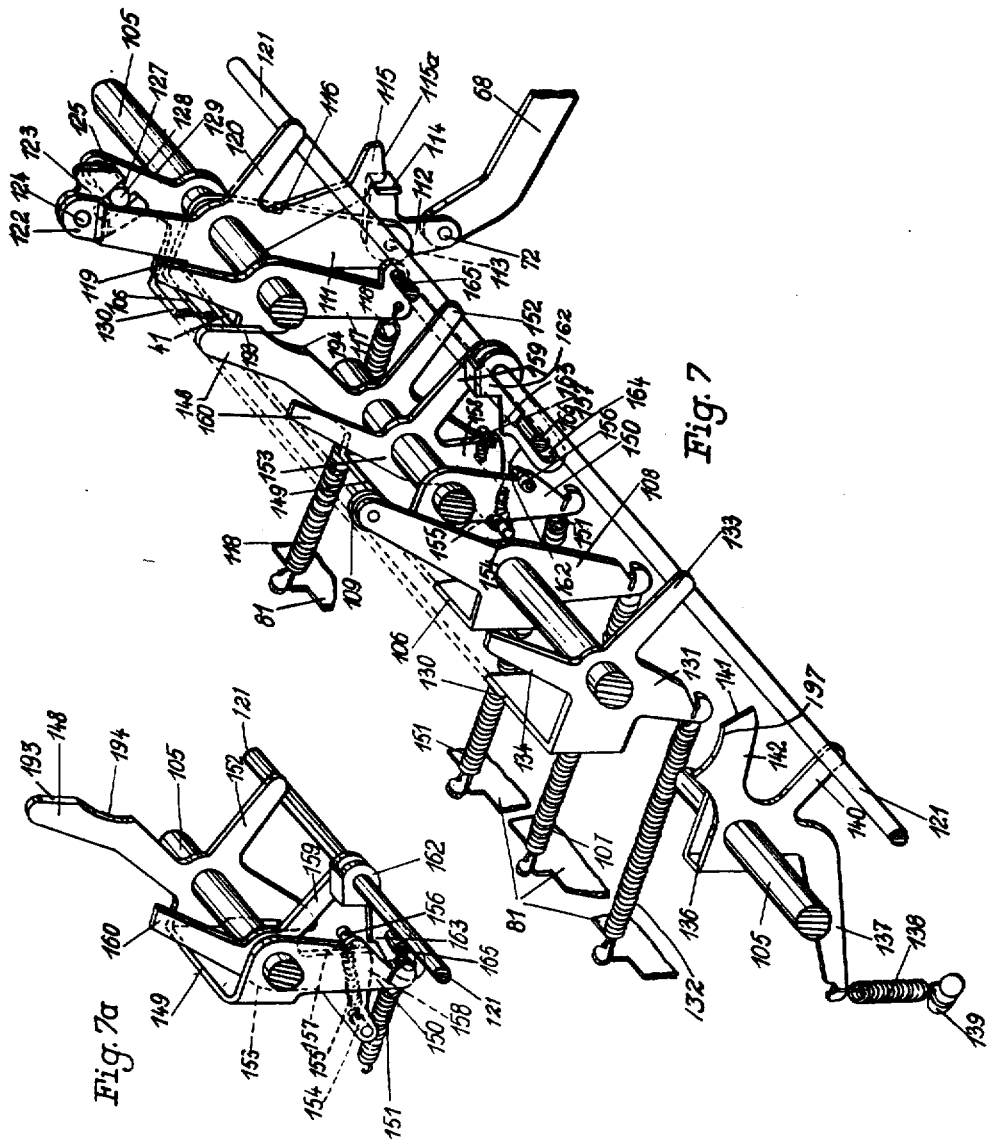

Inventor:
A. F. Pott
by Glascock Downing & Seebold
Attys.

May 7, 1946.   A. F. POTT   2,399,890
SEQUENTIALLY CONTROLLED MULTIPLE CLUTCH MECHANISM
Filed March 26, 1940   11 Sheets-Sheet 7

Inventor:
A. F. Pott
By Glascock Downing & Seebold

May 7, 1946.  A. F. POTT  2,399,890
SEQUENTIALLY CONTROLLED MULTIPLE CLUTCH MECHANISM
Filed March 26, 1940  11 Sheets-Sheet 9

Inventor:
A. F. Pott
By: Glascock Downing & Seebold
Attys.

May 7, 1946.  A. F. POTT  2,399,890
SEQUENTIALLY CONTROLLED MULTIPLE CLUTCH MECHANISM
Filed March 26, 1940  11 Sheets-Sheet 10

Inventor:
A. F. Pott
By: Glascock Downing Seebold
Attys

Patented May 7, 1946

2,399,890

UNITED STATES PATENT OFFICE 2,399,890

SEQUENTIALLY CONTROLLED MULTIPLE CLUTCH MECHANISM

August Friedrich Pott, Zella-Mehlis, Germany; vested in the Alien Property Custodian Application March 26, 1940, Serial No. 326,111 In Germany July 5, 1939

37 Claims. (Cl. 192—48)

This invention relates to sequentially controlled multiple clutch mechanisms for use in machines performing a series of functions in the making of a product.

More particularly the invention is applicable to adding and printing machines, the several mechanisms of which must operate sequentially in timed relation and automatically during the production of a printed ledger or audit sheet, account and the like.

While this result may be obtained in various ways, an object of the present invention is the provision of a series of inter-related clutch mechanisms, so arranged that one of such clutch mechanisms, upon operation, shall control or determine when another of the associated clutch mechanisms shall operate, and when it shall cease operation.

By this arrangement, the use of a special timing device is obviated, the associated clutch mechanisms and their related devices serving in that capacity for the operation of the several mechanical assemblies in the adding and printing machine which are employed in the production work.

Another object is the provision of means to sequentially control the operation of a plurality of mechanical assemblies with an economy of time, whereby the operations of the several mechanical assemblies is effected more rapidly to enable a more speedy completion of the work.

A further object is to reduce the load imposed on the driving shaft of the machine, by regulating the sequential control and operation of the several mechanical assemblies for effecting the several functions necessary in the preparation or production of an audit sheet, for example.

This object is effected by providing separate clutch connections between the power, as the main drive shaft, and the respective mechanical assemblies and arranging that the respective clutches through which the power is transmitted to such assemblies shall be effective only at the proper times, and that after the completion of its work by one assembly, the transmission of power thereto shall cease.

Specifically, the several clutches are preferably mounted on a common power shaft, with mechanism including means to trip the clutch system for operation, and means controlled by the clutch system, once it has been tripped, to automatically effect the sequential operations of the respective clutches in timed relation, and the final cessation of all clutch action at the completion of each entry in the production of an audit sheet or the like.

The invention will be described in connection with an adding and listing accounting machine of the key-set, shaft-operated type, wherein the items of an account may be entered by depressing the appropriate numeral keys, and then depressing a starting key to set the machine in motion.

Generally, in entering an item, the first operation is the setting of the differential members appropriate to the value of the item set up by depressing the numeral keys, to adjustably position the denominational type carriers at the printing line to print the item set up.

The item may be registered in the totalizer synchronously with the positioning of the type carriers or on the return of the type carriers to their normal idle positions, but in that type of accounting machine herein referred to, the type carriers must remain in their differentially set positions a sufficient length of time to allow for the operation of the impression mechanism whereby the types are imprinted on the ledger or audit sheet, bill or the like.

Also and preferably immediately after the entry of the item on the totalizer, carrying mechanism should operate to effect the transfer of any "ones" incident to the addition of the item to an amount already registered on the totalizer.

There is formed, then, the following pattern.

Subsequently to the setting up of an item on the numeral keys, and depression of a starting key, mechanism operates to enable the advance of the members of a differential mechanism to position the proper types of denominational type carriers at the printing line.

Secondly, impression means is operated while the types remain at the printing line, to print the item on the sheet.

Thirdly, the differential mechanism, the type carriers and the impression means are returned by the first-mentioned mechanism to their normal positions.

Fourthly, the item is entered on the totalizer either as the differential mechanism positions the types at the printing line, or during the return of the differential mechanism and type carriers to normal.

Fifthly, the carrying mechanism must operate prior to the entry of the next item in the totalizer to insure the carrying of "ones" into the totalizer wheels of next higher order.

In the complete operation of printing and registering an item in the machine, there are but three which must occur at a particular time, namely, the advance of the differential mechanism, the impression taking, and the restoration of the differential mechanism.

The registration of the item on the totalizer may occur during the advance or during the return of the differential mechanism, and the operation of the carry may take place after the entry of the amount on the totalizer and prior to the entry of the succeeding item.

Indeed, the restoration of the carrying mechanism may be postponed until the advance of the differential mechanism pertaining to the entry of such succeeding item.

It is essential, however, that the imprint of the item be effected at the time the types are positioned at the printing line, but advantage can be taken of the variables to lessen the time required in printing and registering successive items.

Because the cyclic sequence of operation of the multiple clutch mechanisms has been particularly designed for use in an accounting machine, it is believed that the advantages and novelties of the invention can be best appreciated by explanation in connection with such a machine.

The invention will be better understood by reference to the following detailed description in connection with the accompanying drawings showing by way of example and schematically some embodiments of the invention and in which—

Fig. 2 is a detail side view of the driving clutch gear.

Fig. 3 is a view in cross-section on line A—A through the clutch, in accordance with Fig. 2, as viewed in the directions of arrows shown on Fig. 2.

Fig. 4 is a disassembled perspective illustration of the clutch shown in Fig. 3.

Fig. 5 shows a fragmentary plan view of the machine, in accordance with Fig. 1, but for better display of those parts of the driving clutch connected with the motor key, as well as of the tens-shift and the printing mechanism, the coverplate and the paper carriage have been omitted on the drawings.

Fig. 6 shows a perspective view of the starting key and the means which interrupts the control by the starting key of the driving clutch.

Fig. 7 is an extended perspective view of the operating parts controlling the driving clutch, the tens-shift clutch and the printing-mechanism clutch.

Fig. 7a is a fragmentary perspective view of the tensioning bail shown in Fig. 7 in detail.

Fig. 17 shows a machine operating diagram.

*General description of the machine*

Figure 1:
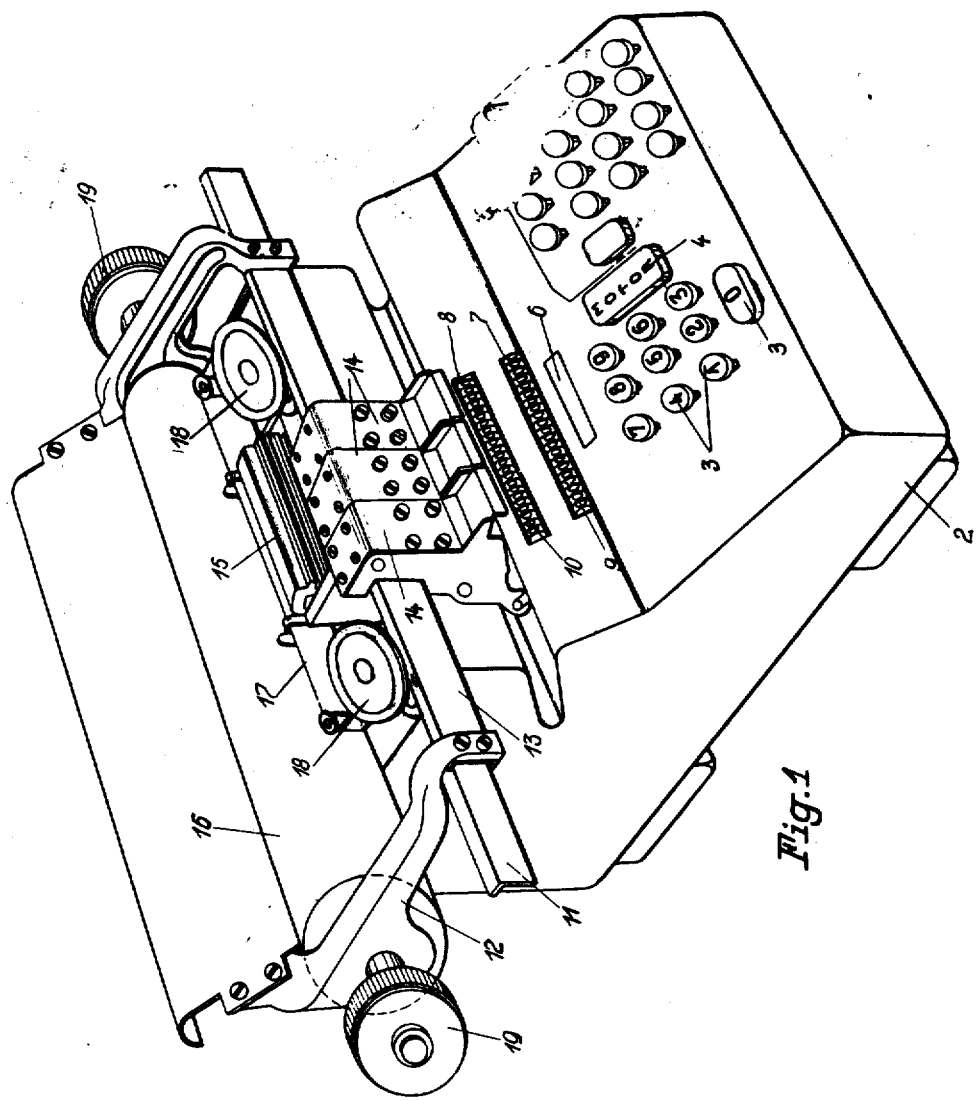
Fig. 1 is a perspective view of an adding machine, as viewed from the left front, having the invention applied thereto.

The adding and printing accounting machine, to which the invention is applied, includes a frame 1, only partly shown on Fig. 5, which supports the operating parts and is concealed by a coverplate 2 (Fig. 1). On the left side of the machine the motor is located which is likewise concealed by the coverplate 2 and is not shown on the illustration. On the same side are located the value keys 3 of a ten-key keyboard. Immediately to the right of this keyboard, the starting key 4 has been arranged. On the right side of the machine there are the different operating keys 5.

Above the ten-key keyboard an inspection window 6 has been provided through which the respective values introduced into a sliding carriage, not shown on the illustration, by depressing the keys 3, can be checked. Above the inspection window 6, two further inspection windows 7 and 8 have been provided through which the number wheels 9 and 10 of two totalizers are made visible.

A paper carriage 12 runs on the guiding rails 11 (only the front rail is visible on Fig. 1). A totalizer-supporting rail 13 attached to the paper carriage 12, removably accommodates a number of totalizers 14.

Furthermore, in the frame 1 (Fig. 5) of the machine there is a printing mechanism 15 (Fig. 1) arranged, the types of which are impressed in known manner by means (not shown) through a typewriting ribbon 17 on a sheet (not shown) supported by the usual platen 16 in the paper carriage 12. The ribbon 17 can be wound on, and unwound from, the two reels 18, respectively. The platen 16 can be suitably adjusted by means of the two turn-knobs 19.

The present invention relates to the sequential control of the driving clutch 20 (Fig. 5), the tens-shift clutch 21 and the printing-mechanism clutch 22, all being operable automatically under control of each other. Since these three clutches are essentially the same in design and construction, it is intended to further explain hereafter only the driving clutch 20.

Detailed description of the driving clutch

A main drive shaft 25 (Figs. 5 and 8–10) extends transversely across the machine and is rotatably supported in the opposite side walls 16 of the machine (one only being shown) and in the intermediate partitions 23 and 24 of the frame 1.

The driving clutch 20, the carry or tens-transfer clutch 21 and the printer operating clutch 22 are all supported on the drive shaft 25.

As already mentioned under the heading "General description of the machine," it is intended hereafter only to explain the detailed construction of the driving clutch, the construction of the tens-shift clutch 21 and the printing-mechanism clutch 22 being identical.

Mounted for rotation on the main driving shaft 25 is a gear wheel 26 (Figs. 2 to 4). On the left side of this gear wheel a semi-circular segmental rib 27 is formed, opposed to and complementing which are two quadrantal ribs 28 and 28a about half as thick as the segment 27, the segments arranged in a circle with their adjacent ends spaced apart. A groove 29 is cut into the segments 28 and 28a as well as in the gear wheel 26 along a chord normal to the center of the gear wheel. A semi-circular clutch pawl 33 rests and slides upon the two spaced quadrantal segments 28 and 28a, the clutch pawl covering the groove 29. The combined thicknesses of the body portions 38 of the clutch pawl 33 and of the quadrantal segments 28, 28a, are equal to the thickness of the semi-circular segment 27, so as to present an outer plane surface. The opposite ends 34 and 35 of the clutch pawl 33 are of a thickness equal to that of the semi-circular segment 27, such ends 34 and 35 fitting and sliding in the openings 36 and 37 formed between the opposite opposed ends of the semi-circular segment 27 and the quadrantal segments 28 and 28a, respectively, to guide the clutch pawl in its movement relatively to the gear wheel 26. A spring 31 anchored at 32 to the clutch pawl 33 and to a pin 30 located in the chordal groove 29 of the gear wheel 26, tends to hold the clutch pawl 33 at one limit of its travel. The anchor pin 32 on the clutch is of sufficient length to extend into the groove 29 to assist in guiding the pawl in its movement.

Additionally, the semi-circular clutch pawl 33 is provided with a thickened portion 39a intermediate its opposite ends, which thickened portion is narrower than the opening 42 between the opposed ends of the two quadrantal segments 28 and 28a in which it is accommodated, to serve as a stop to limit the travel of the clutch pawl in a direction parallel with the chordal groove 29.

Furthermore, the thickened portion 39a is extended radially outward from the pawl 33 to form a tooth 39 with which clutch control levers 40 and 41 (Fig. 8) co-act.

Within the circular recess 43 (Fig. 4) formed by the circular segments 27, 28 and 28a (Figs. 2, 3 and 4) there is a clutch disk 44 arranged in fixed position on the main driving shaft 25 by the lug 45. The clutch disk 44 has a recess 46 engageable by the lug 33a of the clutch pawl 33. The clutch pawl 33 and the clutch disk 44 are prevented from being displaced by a cover-disk 47 fastened to the circular segment 27 by the screws 48.

Operating manner of the driving clutch

When depressing the starting key 4, the clutch lever 40 is moved clockwise (Fig. 8) and the tooth 39 of the clutch pawl 33 is released by the lug 49 of the clutch lever 40. Furthermore by depressing the starting key 4, the motor which is not shown on the illustration, is started, causing the driving shaft 25 to rotate the clutch disk 44 (Fig. 4) on which the clutch pawl lug 33a bears. As soon as the recess 46 of the clutch disk 44 has reached a point below the lug 33a of the clutch pawl 33, the spring 31 will shift the clutch pawl to snap the lug 33a into the recess 46 of the clutch disk 44, the feet 34 and 35 of the clutch pawl 33 sliding in the recesses 36 and 37. The movement of the clutch pawl in the direction of arrow 50 (Fig. 2), is stopped by the lower edge 51 of the guide foot 39a of the clutch pawl 33 striking against the edge 52 (Fig. 2) of the recess 42 formed between the circular segments 28 and 28a.

Figure 8:
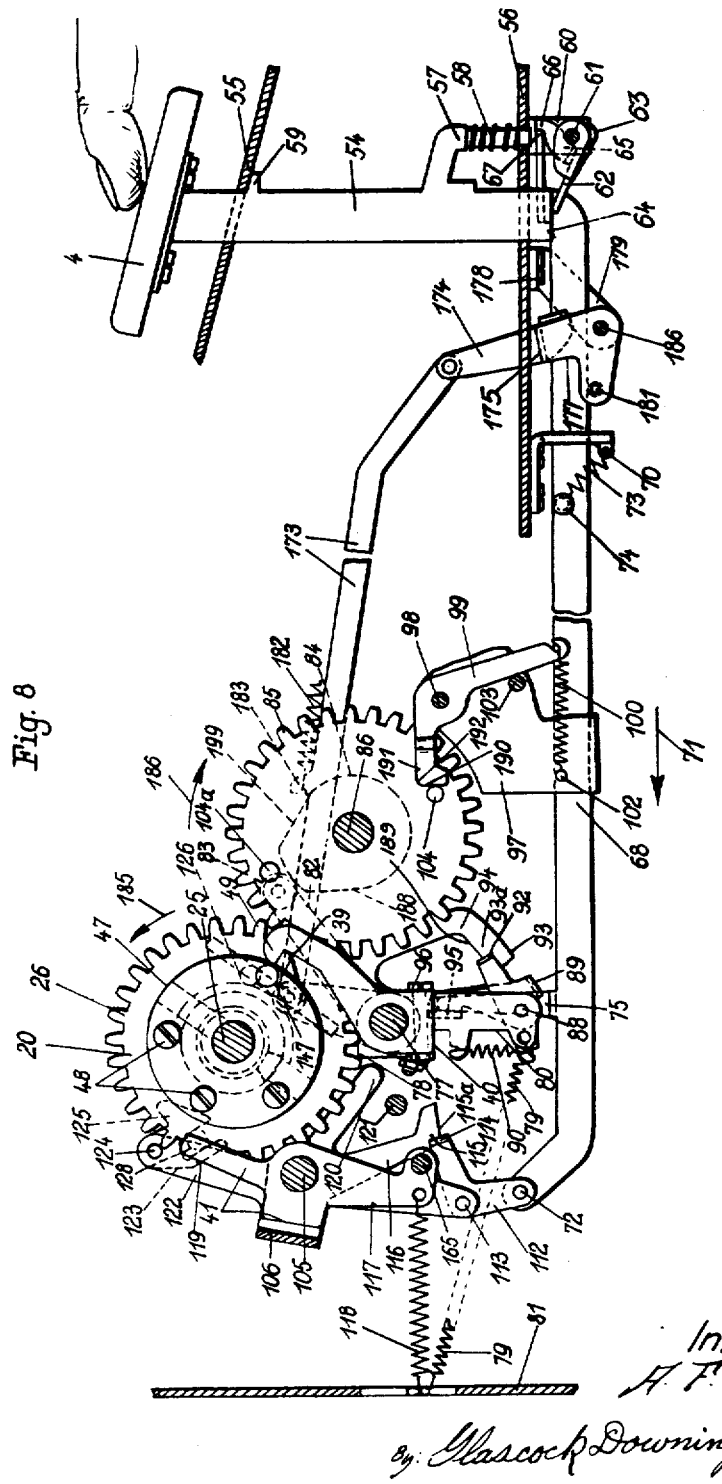
Fig. 8 shows a cross-section of the machine on line B—B of Fig. 5, viewed in direction of the arrows. The operating parts controlling the driving clutch and the driving clutch itself are shown in rest positions.

After the clutch pawl 33 and the drive ring 44 have thus become connected, the gear 26, being a part of the clutch, rotates with the driving shaft 25. After half a turn of the driving clutch 20, the tooth 39 of the clutch pawl 33 strikes against the upper end of arm 119 of the clutch control lever 41 (Fig. 10) lying in the path of the tooth 39. In consequence of this the clutch pawl 33 (Fig. 4) is arrested, while the drive shaft 25 and its clutch ring 44 continue to rotate. The clutch gear 26 also advances slightly relatively to the arrested clutch pawl 33 due to its momentum, to tension the clutch pawl spring 31 and to disengage the clutch pawl lug 33a from the recess 46 in the clutch driving ring 44. The upper edge of the guide foot 39a of the clutch pawl contacts the end 53 of the quadrantal segment 28 to arrest the relative movement between the gear wheel 26 and the clutch pawl. When the auxiliary clutch control lever 41 is moved in anti-clockwise direction (Fig. 10), it releases the tooth 39 of the clutch pawl 33, whereby the connection 46, 33a is resumed in the above-described manner and the driving clutch 20 is again rotated by the driving shaft 25. The disengagement of the driving clutch 20 from the driving shaft 25 is again effected, as described, after another half-turn, through the action of the driving clutch control lever 40, whereupon the driving clutch 20, having performed a complete revolution of 360° assumes its rest position again, as shown in Fig. 8.

Detailed description of the operating parts of the driving clutch, tens-shift clutch and printing mechanism clutch The key stem 54 of the starting key 4 (Figs. 6, 8, 9, 10) slides vertically in the coverplate 55 and the bottom-plate 56 of a key frame which is not shown in the illustration. The key stem 54 has at its lower end an offset projection 57 (Fig. 6) encircled by a spring 58 that tensions a lug 59 formed on the stem against the underside of the coverplate 55 of the key frame and holds the key in normal position.

A non-revolving rod 61 is supported by the bracket 60 which is flanged to the bottom plate 56 of the key frame, and by the right side-wall 16 of the frame 1. An extended wing 62 is journaled on this shaft 61, as shown in Fig. 6, and, by the action of a coiled spring 63 (Fig. 5) the wing is urged clockwise (Fig. 8) around the rod 61. In its normal position the free edge of the wing 62 lies at an angle against the lower edge 64 of the key stem 54. The wing 62 carries an arresting lip 65 (Fig. 6), the upwardly projecting free end 66 of which normally lies in the path of a finger 67 projecting from the slide 68. The slide 68 (Figs. 6, 8, 10) is guided through a slot 69 (Fig. 6) in an angle piece 70 fixed to the bottom plate of the machine frame and can be actuated in both directions of the arrow 71 as well as around its fulcrum 72. A spring 73 fastened to the pin 74 of the slide 68 and to the lower extension of the angle piece 70, tends to hold the slide 68 against the lower edge of the slot 69 of the angle piece 70, when in normal position. A horn 75 (Figs. 6, 8, 9, 10, 11) projects upwardly from the slide 68 at a point where the slide passes beneath the clutch mechanism.

A shaft 77 (Figs. 5, 6, 8, 9, 10, 11) is journaled at its opposite ends in the right side wall 76 (Fig. 5) and the left side-wall (not shown in the illustration) of the machine frame I. This shaft 77 has a U-shaped yoke 78 pivoted thereon. The yoke 78 is moved clockwise by the action of the spring 79 attached at one end to the lower extension 80 of the yoke 78 (Fig. 11) and on the other end to the backwall 81 (Figs. 8, 9, 10) of the machine frame I. The normal position of the yoke 78 is determined by contact of the roller 83, on an arm 82 of the yoke lever 78 with a cam 84 fixed to a gear 85 fast on a rotatable shaft 86 extending transversely of the machine and journaled in the partition walls 23 and 97, and in the left-hand side frame, not shown.

The gear 85 meshes with the gear 26. In both lower extensions 80 and 87 (Fig. 11) of the yoke 78 there is a pin 88 (Figs. 6, 8, 9, 10, 11) having a U-shaped locking pawl 89 pivoted thereon. A spring 90 is fastened at one end to the tail 90a, Fig. 11, of the pawl 89 and at the other end to the projection 91 of the leg 80 of the yoke 78 to normally tension the pawl clockwise around pin 88. The normal position of the pawl 89 is determined by contact of the offset tooth 92 of one arm of the locking pawl 89 against the shoulder 93a, Fig. 8, of an arm 94 of the clutch control lever 40, such clutch control lever being designed in U-shape and fast on the shaft 77. The vertically extending arm of the U-shaped locking pawl 89 is provided with an off-set ear 95, Fig. 11, which lies in the path of the upwardly projecting horn 75 of the slide 68. The clutch control lever 40 is fastened to the shaft 77 by a bolt 96 and is capable of cooperating by the lug 49 of its upwardly extending arm with the tooth 39 of the clutch pawl 33 of the driving clutch.

An angular back lash preventing detent 99 (Figs. 5, 6, 8, 9, and 10) is pivoted at 98 to a partition wall 97, a spring 100 anchored at 102, operating to rock the detent clockwise against a stop pin 103 projecting from the wall 97. The rearwardly extending arm of the detent 99 is capable of cooperating with the studs 104 and 104a projecting at diametrically opposite points from the face of the gear 85. A bar 105 is fixed rigidly in the right sidewall 76, Fig. 5, and in the left sidewall, not shown, of the machine frame I. A U-shaped member 106, Fig. 7, is mounted for rotation on the bar 105. A spring 107 fastened at one end to the downwardly extending leg 108 of the U-shaped member 106 and at its other end to the backwall 81 of the machine frame I normally tensions the member 106 clockwise around the bar 105. The normal position of the U-shaped member is determined by contact of a roller 109 carried by one arm of the bail member 106 with a cam 110 mounted on the printing mechanism clutch 22, Figs. 5, 14 and 15, thus placing the restoration of the main drive clutch tripping means under control of the printing clutch, as will be explained hereinafter. An angular locking pawl 112 is pivoted at its angle at 113 to the lower end of the downwardly extending arm 111 of the U-shaped member 106. The slide 68 is pivotally connected at 72 to pawl 112. The offset tooth 114 of the pawl 112 is capable of cooperating with the foot 115 of a downwardly extending leg 116 of the U-shaped auxiliary clutch control lever 41 effective to temporarily arrest the drive clutch 20 at the end of a half revolution, whereby to afford time for the operation of the printing clutch. The remaining clutches make complete revolutions without interruption and hence, are not provided with auxiliary clutch control levers to arrest them prior to the completions of their cycles. A spring 118 is attached at one end to the opposed downwardly extending leg 117 of the auxiliary clutch control lever 41, and at the other end to the backwall 81 of the machine frame I. The auxiliary clutch control lever 41 is moved clockwise around the shaft 105 by the action of the spring 118. The normal position of the clutch lever 41 is determined by contact of the shoulder 115a of the foot 115 of the leg 116 of the auxiliary clutch control lever 41 with the offset tooth 114 of the pawl 112. In this normal position of the auxiliary clutch control lever 41 the arm 118 lies outside of the path of the projection 39 of the clutch pawl 33 of the driving clutch 20.

The auxiliary clutch control lever 41 has a stop projection 120 capable of engaging with a stop rod 121 which is fastened in the intermediary wall 24 and in the left sidewall, not shown, of the machine frame I.

Figure 9:
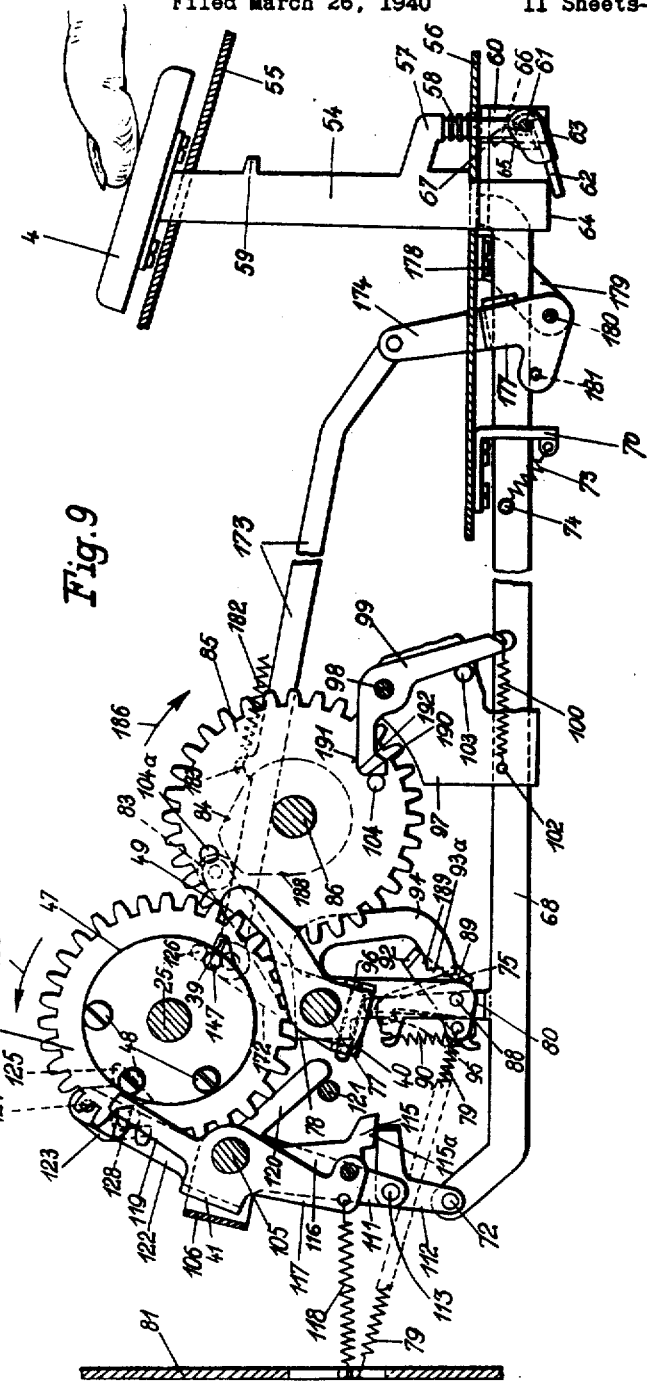
Fig. 9 shows a cross-section in accordance with Fig. 8, the operating parts being shown in the positions assumed after depression of the starting key, while the driving clutch is still in rest position.
Figure 10:
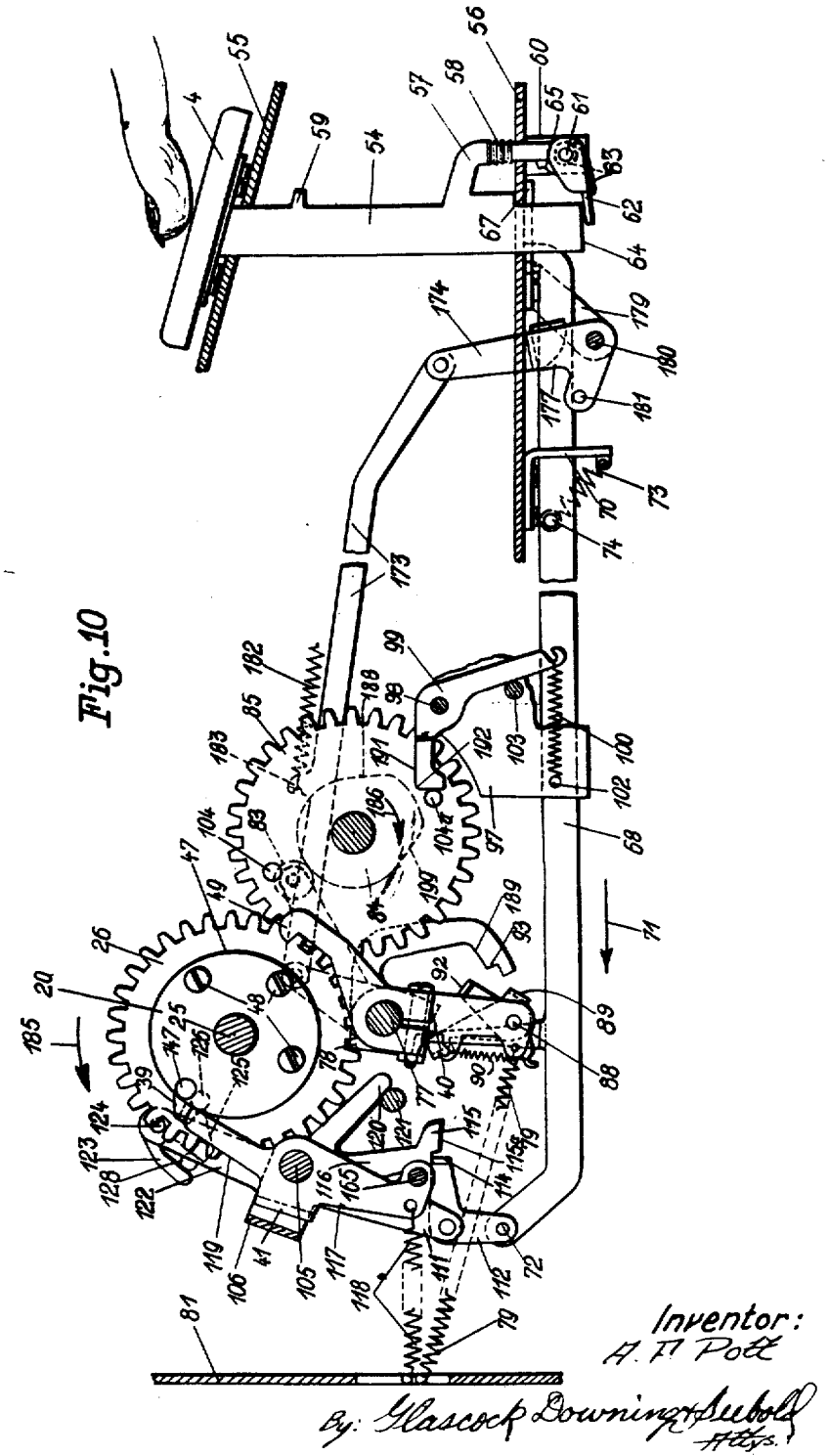
Fig. 10 shows a cross-section in accordance with Fig. 8, the operating parts controlling the driving clutch being shown in those positions into which they have been moved by a cam working under control of the clutch for the printing mechanism.

A pawl 123 is pivoted on an upwardly extending arm 122 of the clutch auxiliary clutch control lever 41 at 124 and is formed with a node to cooperate with a stud 126, Figs. 8, 9, and 10, fixed to the face of the gear 26 of the driving clutch 20. A pin 128 extending through a slot 127, Fig. 7, of the pawl 123 is secured to an upwardly extending arm 129 of a bail-like printer clutch control lever 130 journaled on the shaft 105, as shown in Fig. 7. A spring 132, Figs. 7, 14, 15, and 16, is fastened to a depending leg 131 of the printer clutch control lever 130 and anchored to the backwall 81 of the machine frame I for rocking the printer clutch control lever 130 clockwise around the shaft 105. The normal position of the printer clutch control lever 130 is determined by contact of the forwardly extending stop projection 133 of the printer clutch control lever against the stop bar 121. In this normal position the control arm 134 of the printer clutch control lever 130 lies in the path of the tooth 135 of a clutch pawl, not shown, which is installed in the printing-mechanism clutch 22.

Figure 14:
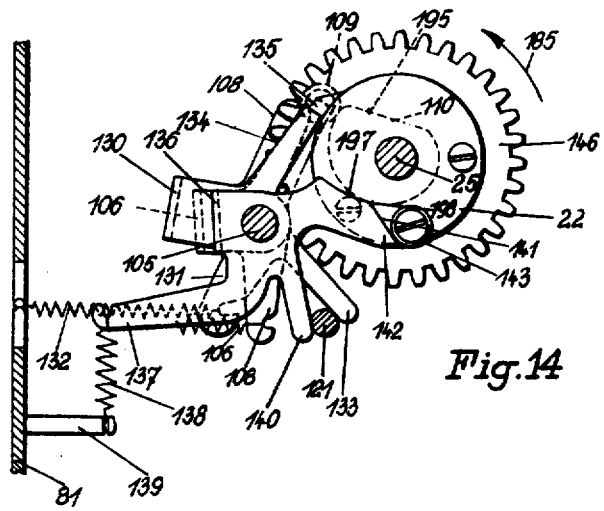
Fig. 14 shows a cross-section of a part of the machine, on line D—D of Fig. 5, viewed in the direction of the arrows, the operating parts controlling the printing-mechanism clutch as well as said clutch, shown in their rest positions.
Figure 15:
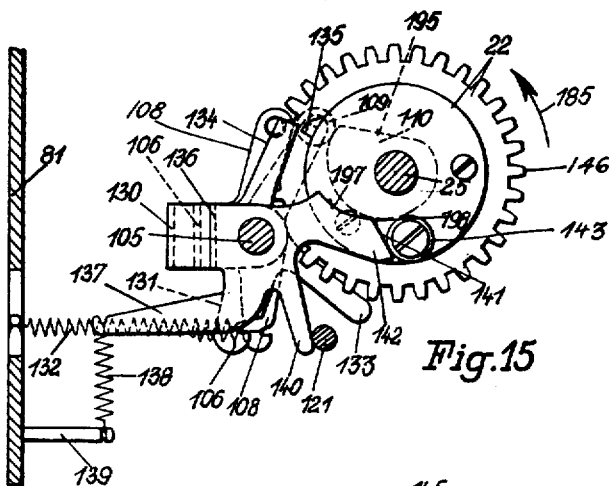
Fig. 15 shows a plan view in accordance with Fig. 14, the operating parts controlling the printing mechanism clutch being shown in a position freeing said clutch.

A yoke-shaped back-lash preventing detent 136, Figs. 7, 14 and 15, is mounted to swing on the shaft 105. A spring 138 is fastened at one end to the rearwardly extending arm 137 of the detent and at the other end to a pin 139 fastened in the rear-wall 81 of the machine frame I. This spring 138 causes the detent 136 to swing around the shaft 105 anti-clockwise. The normal position of the back-lash preventing detent 136 is determined by contact of the forward extension 140 of the detent 146 with the stop bar 121. The surface 141 of the arm 142 of the detent 136 engages with a roller 143 (Figs. 14-16) attached to the printing-mechanism clutch 22.

Figure 16:
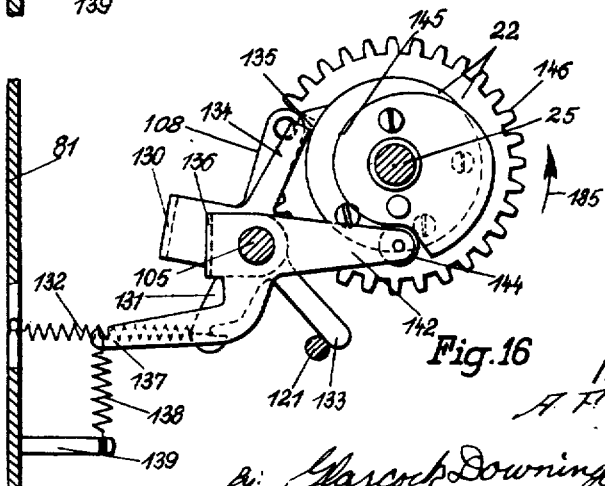
Fig. 16 shows another design of the locking device holding the printing mechanism clutch in rest position.

A modified form of detent 136 is shown in Fig. 16, which differs from that shown in Fig. 15 only in that the arm 142 of the back lash preventing detent 136, Fig. 16, has a roller 144 which bears on a cam 145 mounted on the printing-mechanism clutch 22. The gear 146, Figs. 14, 15 and 16, rigid with the drive member of the printer clutch 22, meshes with a gear for the printing mechanism, not shown and not belonging to the scope of the present invention. A stud 147, Figs. 4, 5, 8, 9 and 10, is mounted on the driving clutch 20 to cooperate with an arm 148 of a U-shaped spring-tensioning member 149, Figs 7, 12 and 13, for the tens-carrying clutch 21, said tensioning member being journaled on the shaft 105. A spring 151 is connected between arm 150 of the U-shaped tensioning member 149 and the rear wall 81 of the machine frame 1 normally urges the U-shaped tensioning member 149 clockwise around the shaft 105. The normal position of the U-shaped tensioning member 149 is determined by contact of the arm 152 with the stop 121. A tens-carrying clutch control lever 153 is also mounted for rotation on the shaft 105.

A spring 155 fastened at 154, Figs. 7, 7a, 12, and 13, to the tens-carry clutch control lever 153 and to a pin 156 of the arm 150 of the U-shaped tensioning member 149 rocks the tens-carrying clutch control lever 153 anti-clockwise around the shaft 105 until the forward edge 157 of the depending arm 158, Fig. 7a, of the tens-carrying clutch control lever 153 strikes against the pin 156 on the depending leg 150 of the tensioning member 148, 149. The forward projection 159 of the tens-carrying clutch control lever 153 cooperates with the stop rod forward projection 121 whilst the control arm 160 of the tens-carrying clutch control lever 153 engages with the tooth 161 of a clutch pawl, not shown, installed in the tens-shift clutch 21. A locking lever 162 (Figs. 7, 7a, 12 and 13) has its U-shaped member journaled on the stop rod 121, and is provided with a shoulder 163 co-acting with the abrupt edge of the leg 158 of the tens-carrying clutch control lever 153 to normally latch the tens-carrying clutch control lever in position to maintain the tens-carrying clutch idle on the bar 121. A pin 165 fixed to the depending leg 117, Fig. 7, of the driving clutch control lever 41 extends through a cam slot 164 formed in the locking lever 162.

Figure 12:
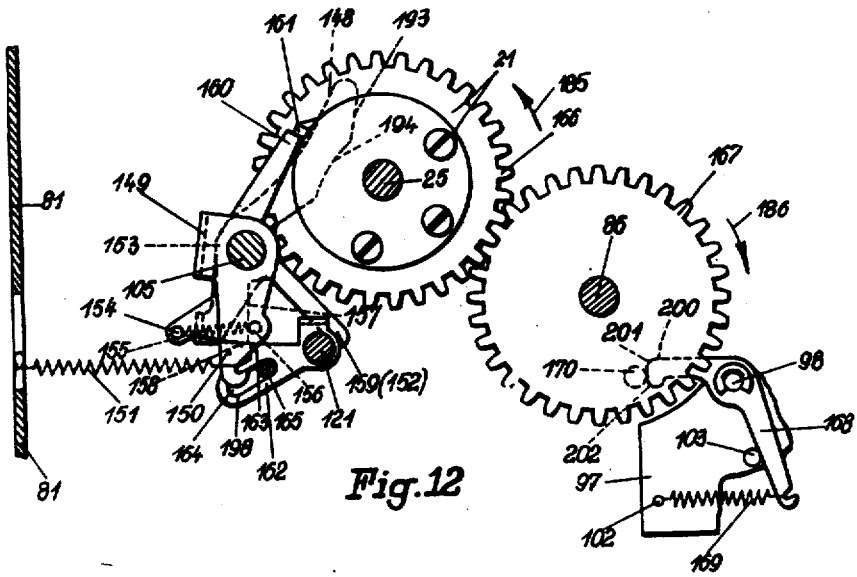
Fig. 12 shows a cross-section on line C—C of Fig. 5 looking in the direction of the arrows, disclosing the clutch for the tens-shift and those parts controlling the same shown in rest position.
Figure 13:
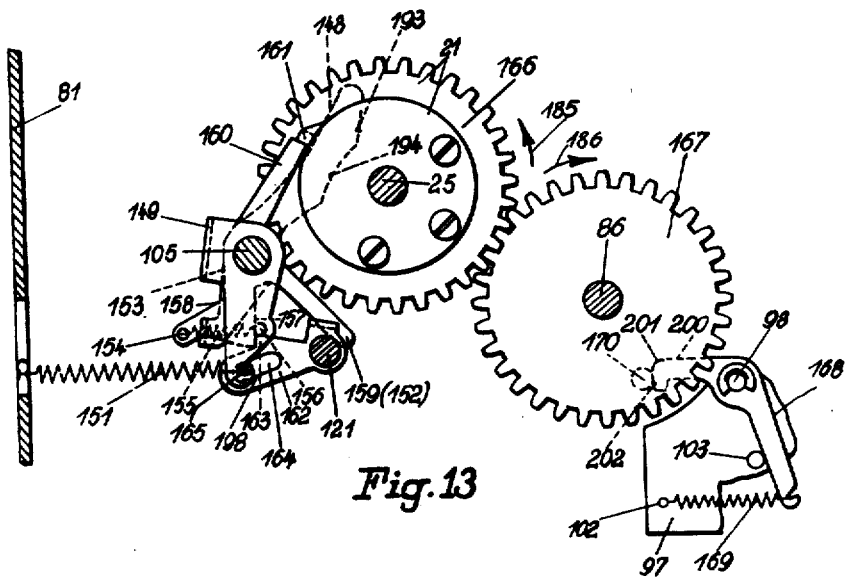
Fig. 13 shows a cross-section in accordance with Fig. 12, the operating parts pertaining to the tens-shift clutch shown in position to lock the tens-carrying clutch control lever effectively in place.

A gear 166 fast with the tens-shift clutch, Figs. 12 and 13, meshes with a gear 167 journaled on the shaft 86 installed in the partition wall 23 and the left side-wall, not shown, of the machine frame 1.

Pivoted on a pin 98, Figs. 12 and 13, is a back-lash preventing detent 168, moved clockwise around the pin 98 by the action of a spring 169 which is fastened on one end to the downwardly extending arm of the detent 168 and on the other end to a pin 102. The normal position of the detent 168 is determined by contact with the stationary pin 103. The rearwardly extending arm of the detent 168 is capable of cooperating with a pin 170 attached to the gear 167 to prevent reverse rotation of the gear 167 and tens-carrying clutch 21, upon its arrest after the completion of a full cycle of rotation.

*Device for disabling the motor key control of the driving clutch*

A crank 172 is fastened by a bolt, 171, Figs. 6, 8, 9, and 10, on the shaft 77 to which the drive clutch control lever 40 is secured. A link 173 is connected to crank 172 at one end and to an arm 174 of a bail 175 at its other end. The bail 175 is pivotally mounted at 176 to the right-hand sidewall 76, and at its opposite end the bail 175 is provided with an angular arm 177 pivotally supported on a rod 180 mounted in a bracket 179 secured at 178 (Fig. 8) to the machine frame. A laterally extending pin 181 mounted in the free end of the arm 177, projects beneath the slide 68.

A spring 182 (Fig. 6) connected to the link 173 at 183 and anchored to the side frame at 184 tends to rock the shaft 77 with the drive clutch control lever 40 thereon in clockwise direction to cause the drive clutch control lever 40 to free the drive clutch 20 for operation.

Also spring 182 tends to rock the bail 175 clockwise to press the pin 181 of the left hand bail supporting arm 177 upwardly against the bottom edge of the slide 68 to rock the projecting finger 67 at the front end of the slide, out of engagement with the arresting lip 65 of the wing 62 controlled by the starting key 4.

The drive clutch control lever 40 and the bail arm 177 with its pin 181 are held against such operation, however, by contact of the shoulder 93a of the depending arm 94 of the drive clutch control lever 40 with the laterally extending lug 92 of the locking pawl 89 pivotally mounted in the yoke-shaped rocking member 78, said locking pawl being held effective by its spring 90, and by the upstanding horn 75 of the slide 68 which determines the normal position of the locking pawl 89.

Furthermore, the yoke-shaped rocking member 78 journaled on the shaft 77 is rockable clockwise by its spring 79, but is held in normal position, by contact of its arm 82 with the clutch-driven cam 84, thus normally affording a fixed fulcrum for the locking pawl.

*Operation of the driving clutch, the tens-shift clutch and the printing-mechanism clutch*

When depressing the motor key 4, Figs. 1, 5, 6, 8, 9, and 10, the key stem 54 is moved downward against the action of spring 58. During this operation, the lower end 64 of the key stem 54 engages the bail 62. Consequently, the bail 62 is moved anti-clockwise, Fig. 9, around the rod 61 against the tension of the torsion spring 63. The arresting lip 65 mounted on the bail 62, during the movement of the bail 62 engages with its lug 66 the projecting finger 67 of the slide 68 which is thus slid rearwardly in the direction of arrow 71 against the tension of the spring 73. During this operation, the horn 75, Figs. 6, 8 and 11, attached to the slide 68, engages the lug 95 of the vertically extending arm of the locking pawl 89, to rock the locking pawl anti-clockwise, Fig. 11, against the tension of the spring 90. When the pawl 89 is moved anti-clockwise, the lug 92 of the pawl 89 releases the shoulder 93a on the depending arm 94 of the drive clutch control lever 40 rigidly mounted on the shaft 77. Thereupon the spring 182 fastened to the link 173, Fig. 6, operates the drive clutch control lever 40 in clockwise direction by the crank 172 and the shaft 77. During this operation the lug 49, Fig. 8, of the drive clutch lever 40 releases the tooth 39 of the clutch pawl 33 installed in the driving clutch 20, whereupon spring 31 (Fig. 4) engages the clutch pawl with the driving ring 44 to connect the driving clutch 20 with the driving shaft 25, as has already been described under the heading "Operation of the driving clutch," so that the driving clutch 20, after a contact (not shown) has been closed, will take part in the revolution of the driving shaft.

The shaft 77 and the crank 172 rigidly mounted thereon, when rocked clockwise by the spring 182, shift the link 173, (Fig. 6) against the direction of arrow 71, whereby the bail 175 is moved clockwise around its pivot 176 and the rod 180 to cause the pin 181 of the bail member 175 to raise the slide 68 from below so that the rear end of the slide 68 is rocked counter-clockwise on its pivoted connection 72 with the locking pawl 112 for the auxiliary clutch control lever 41, against the tension of the spring 73. During this movement the forwardly projecting finger 67 of the slide 68 is raised above the arresting lip 65 of the bail 62, whereby the connection from the motor key 4 to the driving clutch 20 is broken. Should the motor key 4 again be depressed or be kept in depressed condition, a second release of the driving clutch 20 during the calculating operation is impossible, since the projecting finger of the slide 68 is now held above the path of the arresting lip 65 by the pin 181 of arm 177 of the bail 175 under the influence of the spring 182. After the motor key 4 has been released by the operator, the bail 62 under action of the torsion spring 63 and the motor key 4 under action of the spring 58 will resume their positions of rest shown in Fig. 8 during which the normal position of the motor key 4 is fixed by the lug 59 of the key stem 54 striking against the underside of coverplate 55.

When the slide 68 is moved in the direction of arrow 71, the pawl 112, Figs. 6, 7, 8, 9 and 10, which normally locks the auxiliary drive clutch control lever 40 in its idle position, is moved clockwise around the pivot 113 from the position shown in Fig. 8 into the position shown in Fig. 9. During this operation, the lug 114 of the locking pawl 112 releases the shoulder 115 of the arm 116, Fig. 7, of the U-shaped auxiliary driving clutch control lever 41, so that this lever 41 is moved clockwise around the shaft 105 by the tension of the spring 118. The movement of the auxiliary driving clutch control lever 41 is stopped by the arm 120 striking against the stop rod 121. By the clockwise movement of the auxiliary driving clutch control lever 41 the lug 114 of the locking pawl 112 strikes against the surface 115a, Fig. 7, of the foot 115 of the auxiliary driving clutch control lever 41 from below, Fig. 9. During the movement of the auxiliary driving clutch control lever 41, its control arm 119 is brought into the path of the tooth 39 of the clutch pawl 33 of the driving clutch 20.

During the clockwise movement of the auxiliary driving clutch control lever 41, Fig. 7, around the shaft 105, the tappet 123 pivotally mounted on the upwardly extending arm 122 is also moved anti-clockwise relatively to the pin 128 of the arm 129 of the printer clutch control lever 130, which pin now acts as a fulcrum causing the lug 125 of the tappet 123 to move into the path of the stud 126, Fig. 9, of the driving clutch to enable the driving clutch to trip the printer clutch control lever 130 for operation at a predetermined time in the operation of the driving clutch. By the clockwise movement of the auxiliary driving clutch control lever 41, the slotted locking arm 162 is rotated clockwise on the stop rod 121 by the pin 165, Fig. 7, of the depending leg 117 of the auxiliary driving clutch control lever 40 to interpose the shoulder 163 of the slotted locking arm 162 in front of the edge 151 of the tens carrying clutch control lever 153, Fig. 13, mounted for rotation on the shaft 105 and controlling the tens-shift clutch 21, Fig. 5.

As soon as the driving clutch 20 starts turning in the direction of arrow 185, Fig. 8, at 0°, Fig. 17, its gear 26 turns the gear 85 in the direction of arrow 186. The cam 84 rigidly mounted on the gear 85 partakes in this movement and presents its reduced circumference 188 (Fig. 6) to the roller 83 carried on the arm 82, Fig. 6, of the U-shaped rocker 78. The spring 79 is thus permitted to swing the rocker 78 and the locking pawl 89 clockwise, during which movement, the offset lug 92 of the locking pawl 79, which, it will be remembered, after release from the shoulder 93a of the depending drive clutch control lever arm 94, lies on the hooked edge 189 of the lever arm 94 (Fig. 9), is drawn rearwardly until its offset lug 92 drops off the shoulder 93a to lie on the edge 93 of the depending arm 94 behind the shoulder 93a.

As the driving clutch 20 approaches the end of the first half revolution, the rocker member 78 lies at its extreme clockwise limit of travel with the roll 83 of the rocker in contact with the lower concentric circumference of the cam 84 indicated in dotted lines in Fig. 10. At this point in the operation, the normally idle auxiliary drive clutch control lever 41 is in its effective position to arrest the drive clutch 20 at the end of the first half-revolution of the clutch, said clutch control lever 41 having been released for effective operation by depression of the starting key 4, and the drive clutch control lever 40 remains in its tripped position to release the drive clutch 20 for operation.

However, the locking pawl 112 for normally retaining the auxiliary drive clutch control lever 41 in idle position, lies in contact with the sole of the foot 115 of the arm 116 of the auxiliary clutch control lever 41 in readiness to lock the clutch control lever in its idle position, as soon as such clutch control lever is restored to its idle position, and the lug 92 of locking pawl 89 lies behind the shoulder 93a of the depending arm 94 of the drive clutch control lever 40 in readiness to rock said drive clutch control lever 40 to position to interrupt the clutch action of drive clutch 20 at the end of a complete revolution, as soon as the cam 84, on the second half revolution of the drive clutch, swings the rocker back to normal position.

Returning now to the beginning of the operation, when the gear 85, Fig. 8, starts turning in the direction of arrow 186, the stud 104 mounted on the gear 85 will withdraw from the abutting end 190 of the back-lash preventing detent 99, whilst the depending arm of the detent 99 under action of the spring 100 engages a pin 103 and remains in its normal position shown in Fig. 8.

Shortly before a half-turn of the gear 85 has been completed, the stud 104a mounted on the face of gear 85 diametrically opposite the stud 104, engages the edge 191 of the detent 99 turning it anti-clockwise around its pivot 98 against the action of the spring 100 until the stud 104a slides over the edge 192 of the detent 99. Under the tension of the spring 100, the detent 99 is moved clockwise again around the pin 98 and the surface 190 of the detent 99 now lies against the stud 104a of the gear 85, whereby the driving clutch 20 is prevented from turning back against the direction of arrow 186 of the clutch pawl 33 installed in the driving clutch 20, under the action of the clutch pawl spring 31 (Fig. 4).

Before the driving clutch 20 has completed its first half-turn, a stud 147 attached to the driving clutch 20, Figs. 8, 9, 10, will engage the edge 193, Figs. 12 and 13, of the arm 148 of the U- shaped tensioning bail member 149, Figs. 7 and 7a, whereby the member 149 is moved anti-clockwise around the shaft 105 against the spring 151. When the driving clutch 20 has completed its first half-turn of 180°, Fig. 17, the stud 147 of the driving clutch 20 passes into the recess 194 of the arm 148 of the U-shaped tensioning member 149 and holds the latter in its shifted position. When the U-shaped tensioning member 149 has been moved anti-clockwise, the spring 155, which is fastened on one end to the pin 156 of the arm 150 of the U-shaped tensioning member 149 and on the other end is attached to a pin 154 of the tens-carrying clutch control lever 153, is expanded since, as has been described, the tens-carrying clutch control lever 153 cannot be influenced by the spring 155 owing to the interpositioning of the shoulder 163 (Fig. 7) of the slotted arm 162 in its path. The tension stored in spring 155 by the operation of the drive clutch 20 is later utilized to trip the tens-carrying clutch 21.

Shortly before the first half-turn of the driving clutch 20 has been completed, the pin 126, Fig. 9, which is fastened on the gear 26, will engage the node 125 of the tappet 123, moving the latter clockwise around the pivot 124. Such clockwise rotation of the tappet causes it, by means of the slot and pin connection 127, 128 (Fig. 7) with the upstanding arm 129 of the printer clutch control bail lever 130, to rock said bail rearwardly (counter-clockwise) against the tension of the spring 132 and displace the control arm 134 from engagement with the printer clutch pawl 135 to free the printer clutch 22 for operation, as shown in Fig. 15.

Therefore, the printer clutch 22, tripped by the drive clutch stud 126, starts to operate just as the drive clutch 20 about completes its first half revolution. Simultaneously the tooth 39 of the clutch pawl 33 of the driving clutch 20 strikes against the auxiliary clutch lever control arm 119, Fig. 10, of the auxiliary clutch lever 41, whereby the driving clutch 20 is disengaged from the driving shaft 25, as has been described under the heading "Operation of the driving clutch," and the driving clutch comes to a stop after a turn of 180°, Fig. 17.

The cam 110, Figs. 14 and 15, also partakes in the movement of the printing-mechanism clutch 22 to which it is rigidly fastened to first position the drop 195 of the cam 110 opposite the roll 109 of the lock-controlling bail or member 106, in order to enable the printer clutch to effect the printing operation while the types (not shown) are still in printing position. Simultaneously with the presentation of the drop 195 to the roller 109, Fig. 7, of the U-shaped lock-controlling member 106, the roll drops down to the low point of the cam 110 to enable the U-shaped lock-controlling member 106, Fig. 6, under the action of the spring 107 to rock clockwise around the shaft 105 from the position shown in Fig. 9 into the position shown in Fig. 10.

During the clockwise movement of the U-shaped lock-controlling member 106, the lug 114 of the locking pawl 112 slides rearwardly along the bottom of the foot 115 of the auxiliary clutch control lever until under the action of the spring 73, which is fastened to the slide 68, the lug 114 of the locking pawl 112 snaps behind the shoulder 115a of the auxiliary clutch control lever 41, Fig. 10.

Obviously, lock controlling member 106, on such clockwise rotation, withdraws the locking pawl 112 bodily towards the rear of the machine, drawing with it the slide 68 connected thereto, in the direction of arrow 71. Simultaneously the horn 75 of the slide 68 engages again the ear 95 of the locking pawl 89 for the drive clutch control lever 40 and rocks the locking pawl counterclockwise around the pin 88 against the spring 90 from the position shown in Fig. 9 into the position shown in Fig. 10, wherein the locking pawl lies out of the path of the drive clutch control lever 40, and said lever 40 lies in idle position.

Shortly before the printing-mechanism clutch 22 completes its revolution, the back lash preventing roller 143 on the printing-mechanism clutch 22, Figs. 14 and 15, engages the edge 197 of the multiple armed back lash preventing detent 136, Fig. 7, to rock it clockwise around the shaft 105 against the spring 138. As soon as the roller 143 of the printing-mechanism clutch 22 slides over the edge 199 of the arm 142 of the back-lash preventing detent 136, the latter is turned counterclockwise around the shaft 105 by the action of the spring 138. Simultaneously the surface 141, Fig. 14, of the back-lash preventing detent 136 engages the roller 143 of the printing-mechanism clutch 22 and holds it in the position of rest shown in Fig. 14. Reverse rotation of the printing-mechanism clutch 22 under the action of the spring, not shown, which is fastened to the clutch pawl of the printing-mechanism clutch 22, in the same manner as is spring 31 (Fig. 4) of the drive clutch 20, is therefore prevented.

Approximately after a half-turn of the printing mechanism clutch 22 and of the cam 110, the U-shaped locking pawl carrier 106, Figs. 6 and 7, is rocked anti-clockwise around the shaft 105 by the cam 110, Fig. 14, and against the spring 107. During the second half-revolution of the printer-clutch 22, therefore, the lug 114, Fig. 8, of the auxiliary locking pawl 112 engages the shoulder 115a of the auxiliary clutch control lever 41 of the driving clutch, whereby the auxiliary clutch control lever 41 is moved anti-clockwise around the shaft 105 against the action of the spring 118 to displace the control arm 119 of the auxiliary clutch control lever 41 from the path of the clutch pawl tooth 39 to free the drive clutch 20 so that it can make its second half revolution.

Thus the printer cam 22 controls the operation of the drive clutch 20 at this point in the rotation of the latter.

Counter-clockwise rotation of the bail 106 advances the slide 68, the lower edge of which rides over the stud 181 of the bail 175 which remains in its set position, so that the slide advances at an ascending angle. When the slide 68 is moved against the direction of arrow 71, the horn 75, Fig. 6, of the slide 68 releases the ear 95 of the locking pawl 89. Consequently the pawl 89 is free to move clockwise around the pin 88 under the action of the spring 90 from the position shown in Fig. 10 into the position shown in Fig. 8 with respect to the shoulder 93a of the driving clutch control lever 40 to latch it in position to disconnect the clutch at the end of its second half revolution.

During the anti-clockwise movement of the auxiliary drive clutch control lever 41, resulting in the release of the drive clutch 20 for its second half revolution, the upwardly extending arm 122 of the auxiliary clutch control lever 41 is rocked to swing its tappet 123 and withdraw its node 125 from the path of the stud 126 projecting from the face of the gear 26, as shown in Fig. 10, to the position shown in Fig. 9.

This shift of the tappet 123 is occasioned by the combined counter-clockwise action of the arm 122 of the auxiliary clutch control lever 41 and of the spring-driven clockwise return to effective position of the arm 129 of printer clutch control lever 130, which arm carries the pin 128 accommodated in the slot 127 in the tappet.

Furthermore, during such anti-clockwise movement of the auxiliary drive clutch control lever 41 of the pin 165, Figs. 7 and 7a, which is attached to the arm 117 of the auxiliary drive clutch control lever 41, bears on the lower edge 198, Fig. 13, of the slot 194 of the arm 162 to rock the arm 162 anti-clockwise around the stop rod 121. As a result, the shoulder 163 of the arm 162 releases the edge 157 of the tens-carrying clutch control lever 153 of the tens-shift clutch 21 and at that moment the tens-carrying clutch control lever 153 is moved anti-clockwise around the shaft 105 by the action of the spring 155 which has been tensioned by the U-shaped tensioning member 149. Owing to the movement of the clutch lever 153, its control arm 160 releases a clutch pawl, not shown, which is arranged in the tens-shift clutch 21, so that both the tens-shift clutch 21 and the driving clutch 20 participate in the movement of the driving shaft 25.

During the second half-revolution of the driving clutch its cam 84 is rotated in the direction of arrow 186 by means of the gears 26, 85, Fig. 8, to cause the ascending face 199 of the cam to elevate the roller 83, Fig. 6, of the U-shaped locking pawl carrier 78 to rock the latter, as well as the pawl 89 anti-clockwise around the shaft 77. During this movement the lug 92 of the locking pawl 89 engages the shoulder 93a of the drive clutch control lever 40, Fig. 11, and tends to move such drive clutch control lever in an anti-clockwise direction, whereby the lug 48 of the clutch lever 40 is again thrown into the path of tooth 39 of the clutch pawl 33 which is arranged in the driving clutch 20 and thereby causes the driving clutch 20 to be arrested after the second half-turn of 180°, Fig. 17.

The restoration of the drive clutch control lever 40 to effective position relatively to the drive clutch 20, rocks shaft 77 to which the drive clutch control lever 40 is secured.

The gear 85 also participates in the movement of the driving clutch 20 by means of gear 26. Shortly before the second half-turn of the driving clutch 20 as well as of the gear 85 in the direction of arrow 186, has been completed, the stud 104 of the gear 85 bears on the edge 191 of the back lash preventing detent 99 and tends to move it anti-clockwise against the spring 100. As soon as the stud 104 slides off the edge 192 of the back lash preventing detent 99, this back lash preventing detent 99 is again moved clockwise by the action of the spring 100 and the edge 190 of the back lash preventing detent 99 again comes to lie before the stud 104, Fig. 8.

After the second half-turn of the driving clutch 20 has been completed, the roller 83 of the U-shaped lock pawl carrying member 78 lies again on the raised part of the cam 84.

During the second half-turn of 180°, Fig. 17, of the driving clutch 20, the stud 147, Figs. 8, 9, 10, 12 and 13, again releases the arm 148 of the U-shaped tensioning member 149, Fig. 7a, whereby this member 149 is moved clockwise around the shaft 105 by the action of the spring 151.

Simultaneously the pin 156 fastened to the arm 150 of the U-shaped tensioning member 149 bears on the edge 157 of the tens-carrying clutch control lever 153 to rock the latter in clockwise direction around the shaft 105. During this rocking movement, the arm 160 of the tens-carrying clutch control lever 153 again enters the path of the clutch pawl arranged in the tens-shift clutch 21, which causes the tens-shift clutch 21 to be arrested after a turn of 360°, Fig. 17.

Figure 11:
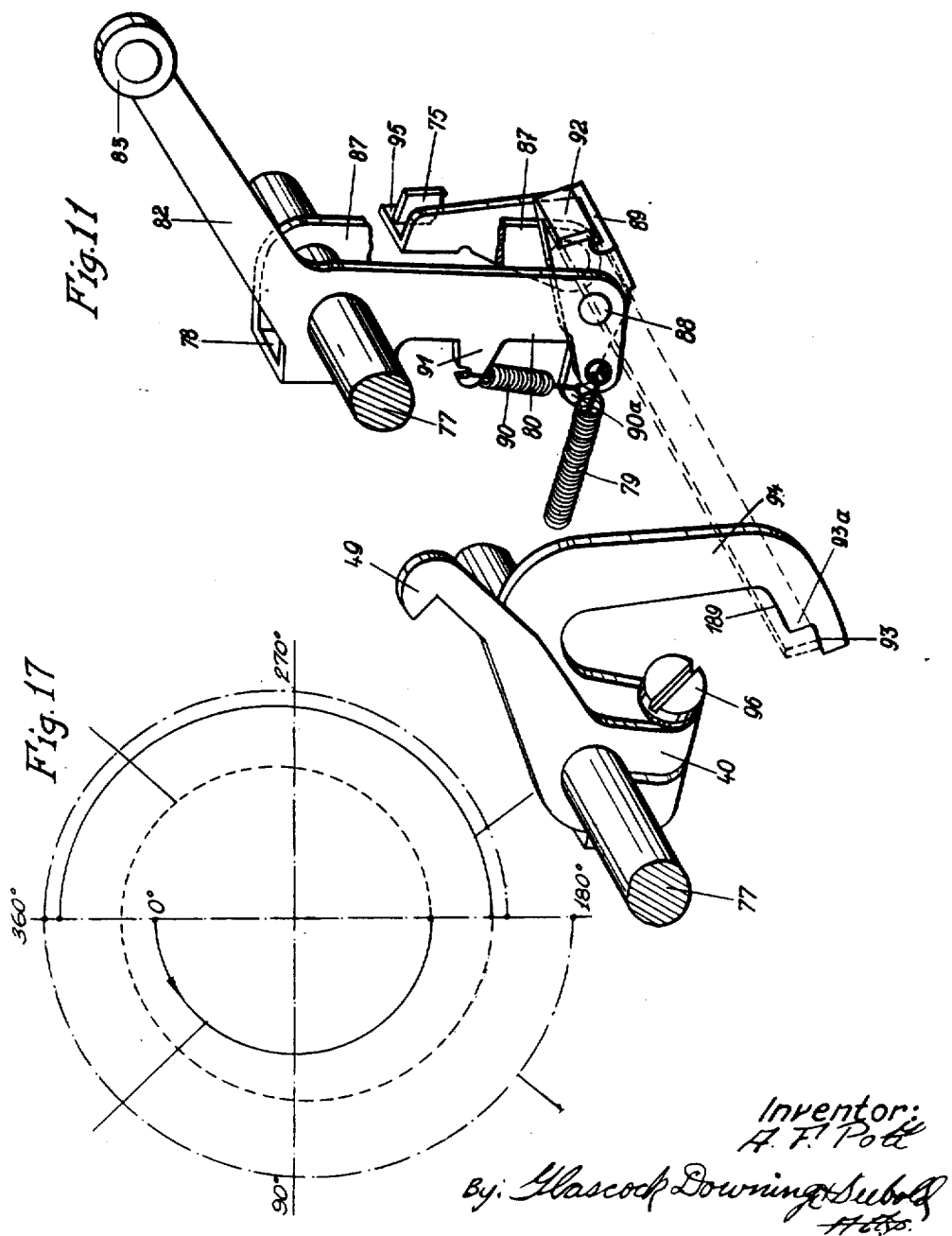
Fig. 11 is an enlarged detail perspective view of the clutch control lever for the drive clutch, and of its latching means.

During the movement of the U-shaped pawl-carrying yoke-shaped rocking member 78, Figs. 6 and 11, in an anti-clockwise direction, in which also the shaft 77 participates because of the engagement of the lug 92 of the clutch locking and release pawl 89 with the shoulder 93a on the arm 94 of the clutch disconnecting dog 48, 49, the bail 175 is moved anti-clockwise by means of the crank 172, Fig. 6, and the link 173. Simultaneously the pin 181 of the bail 175 releases the slide 68, so that this slide is drawn downwards around its pivot 72 by the action of the spring 73 to position the front end of the projecting finger 67 in line with the lip 65 of the bail 62, whereby the connection between the motor key 4 and the driving clutch 20 is reestablished.

Shortly before the complete rotation of the tens-shift clutch 21, Figs. 12 and 13, the stud 170 mounted on the gear 167 of the tens-carrying clutch 22 engages the edge 200 of the back lash preventing detent 168 and moves the latter anti-clockwise against the spring 169. As soon as the stud 170 of the gear 167 has moved past the edge 201 of the detent 168, the latter is moved clockwise by the action of the spring 169 to position its end 202 behind the stud 170 of the gear 167, whereby any turning backwards of the tens-shift clutch 21 due to the tension of the clutch pawl spring in the tens-shift clutch 21 is prevented.

The apparatus of the present invention has been described in detail with reference to specific embodiments. It is to be understood, however, that the invention is not limited by such specific reference but is broader in scope and capable of other embodiments than those specifically described and illustrated in the drawings.

I claim:

1. A control for clutches comprising a plurality of associated clutches including a driving clutch of the half turn type, a driving shaft common to all of said clutches, a series of levers operable to effect engagement and disengagement of said clutches, a starting key, a driving connection between said driving clutch and said starting key, said series of levers including means for automatically connecting a second clutch upon completion of one half turn of said driving clutch, and means for automatically connecting said driving clutch for one half turn and a third clutch for one turn upon completion of one turn of said second clutch.

2. A control for clutches comprising a plurality of associated clutches, including a driving clutch, a driving shaft common to all of said clutches, a series of levers operable to effect engagement and disengagement of said clutches interdependently, successively and automatically in a predetermined order, a starting key, means including a sliding and rocking member operable by said key and a clutch control member, a spring, means operated by said spring for disconnecting said sliding and rocking member from said starting key simultaneously with the movement of said clutch-control member into a position to release the driving clutch to discontinue the automatic successive operation of the clutches.

3. A control for clutches, comprising a plurality of associated clutches, including a driving clutch of the half turn type, a driving shaft common to all of said clutches, a series of levers operable to effect engagement and disengagement of said clutches interpendently, successively and automatically in a predetermined order, a starting key, means including a sliding and rocking member and a clutch control member, a spring, means operated by said spring for disconnecting said sliding and rocking member from said starting key simultaneously with the movement of said clutch-control member into a position to release the driving clutch to discontinue the automatic successive operation of the clutches, and a second clutch-controlled member, and means rendered operable by said sliding and rocking member to bring said second clutch-control member into a position for disconnecting said driving clutch after one half turn simultaneously with the positioning of said first clutch control member to release the driving clutch for operation.

4. A control for clutches comprising a plurality of associated clutches, one of which is a driving clutch of the half turn type, a driving shaft for said clutches, a series of levers operable to effect engagement and disengagement of said clutches interdependently, and successively automatically in a predetermined order, a starting key, means including a sliding and rocking member and a clutch control member, said clutch-control member being adapted to be brought into a position to release the driving clutch, a second clutch-control member, and means under control of said sliding and rocking member to shift said second clutch control member simultaneously with the release of said first clutch control member, into a position for disconnecting said driving clutch after one half turn, including a second locking mechanism interconnected between said second clutch-control member and said sliding and rocking member.

5. In a machine of the class described, the combination with a plurality of clutches; of a drive shaft with which the driven members of said clutches may be sequentially connected and disconnected for concomitant and for individual rotation; means to initiate the engagement of the driven member of one of said clutches with the shaft; and means to effect the engagement and disengagement of the driven members of the remaining clutches and shaft according to a predetermined order, said means operable interdependently by the clutches.

6. In a machine of the class described, the combination with a plurality of clutches; of a drive shaft with which the driven members of said respective clutches may be sequentially connected and disconnected for concomitant and individual rotation; clutch control levers for the respective clutches; and means to mutually inter-relate the clutches and their control levers, and controlled by certain of the clutches, the effectivity of which means is dependent upon such clutches, to automatically effect the disengagement of the respective clutch control levers in sequential order to engage the driven members of said clutches with and to disengage them from the drive shaft.

7. In a machine of the class described, the combination with a plurality of clutches; of a drive shaft with which said clutches may be sequentially connected and disconnected for concomitant and for individual rotation; clutch control levers for the respective clutches; means controlled by one of said clutches to effect the release of the clutch control of the other, and a second means operable by said other clutch and effective upon the clutch control lever of said first-named clutch to release said first-named clutch for operation.

8. In a machine of the class described, the combination with a plurality of clutches; of a drive shaft with which said clutches may be sequentially connected and disconnected for concomitant and for individual rotation; clutch control levers for the respective clutches; means controlled by one of said clutches to effect the release of the clutch control of the other, and a second means operable by said other clutch and effective upon the clutch control lever of said first-named clutch to release said first-named clutch for operation; means operable by said first-named clutch to tension a third clutch control lever for operation; means settable to position to delay the operation of said third clutch control lever; and means operable by said other clutch coincidentally with its release of said first-named clutch, to displace the settable delaying means to enable the tensioned means to operate.

9. In a machine of the class described, the combination with a plurality of clutches; a drive shaft common to the several clutches; clutch control means normally effective to retain the several clutches disconnected from the drive shaft; means to trip one of the clutches for operation; means operable by said tripped clutch to condition the remaining clutches for operation; and means operable by one of said remaining clutches to initiate the restoration of the clutch control means of said first-named clutch, to disconnect said first-named clutch from its drive shaft.

10. In a machine of the class described, the combination with a plurality of normally idle, sequentially operable clutch mechanisms; a drive shaft common to the clutches; and means to trip one of said clutches for operation; of means to disconnect the control of the clutch tripping means, and operable synchronously with, and incident to, the clutch-tripping means; means set for operation incident to the operation of said clutch-tripping means to arrest said first-named clutch prior to the completion of a full cycle; means conditioned by said clutch-tripping means and operable by said first-named clutch prior to its arrest, to trip a second clutch for operation; means operable by said first-named clutch prior to its arrest, to condition a third clutch for operation; means controlled by said first-named clutch-tripping means to temporarily prevent operation of said third clutch; means operable by said second-named clutch to trip the arresting means for said first-named clutch to enable said clutch to complete its cycle, and thereby release the means which temporarily prevents operation of said third-named clutch, freeing said clutch for operation; and means operable by said first-named clutch to restore its clutch tripping means to effective position to disconnect the first-named clutch and the drive shaft, and incidentally thereto, reestablish the connection between said clutch tripping means and its control during the revolution of said third clutch.

11. In a machine of the class described, the combination with a plurality of clutches; a drive shaft with which said clutches may be sequentially connected and disconnected; a clutch control individual to each clutch; and interconnecting means operable by certain of the respective clutches as they rotate to automatically shift the clutch controls out of and into effective position to enable the rotation and arrest of said clutches successively.

12. In a machine of the class described, the combination of a plurality of clutches greater than two; a drive shaft with which said clutches may be sequentially connected and disconnected for concomitant and individual rotation; means controlled and actuated by one of said clutches during its rotation to condition a second clutch for rotation subsequently to the arrest of the first-named clutch; and means operable by the second of said clutches to enable the rotation of a third clutch subsequent to the arrest of said second clutch.

13. In a machine of the class described, the combination of a plurality of clutches greater than two; a drive shaft with which said clutches may be sequentially connected and disconnected for concomitant and individual rotation; means controlled and actuated by one of said clutches during its rotation to condition a second clutch for rotation subsequently to the arrest of the first-named clutch; and means operable by the second of said clutches to enable the rotation of a third clutch subsequent to the arrest of said second clutch, said last-named means also effective to release the first-named clutch for operation concomitantly with the rotation of said third clutch, and to arrest said first-named clutch at the end of a single cycle, while the third clutch continues to rotate.

14. A machine of the class described, including a clutch unit of three associated clutches; a drive shaft for said clutches; a clutch control individual to each clutch; interconnecting means between certain of said clutches and the said clutch controls, to automatically effect the engagement and the disengagement of said clutches interdependently and successively according to a predetermined order; and means to trip one of said clutch controls to initiate the interdependent actuation of the clutches.

15. A control for clutches comprising a plurality of associated clutches, including a driving clutch, a driving shaft for said clutches, connections operable to effect engagement and disengagement of said clutches, interdependently, successively and automatically, a starting key, a trip member, a normally effective clutch control member shiftable to release the driving clutch for operation, a second but normally ineffective clutch control member shiftable under control of said trip member, simultaneously with said first clutch control member, to position to disengage said driving clutch after a partial revolution thereof, and a locking mechanism for said second clutch control member, and interconnected between said second clutch control member and said trip member, and including a shiftable carrier and a pawl controlled by another of the clutches and the second clutch control member.

16. A control for clutches comprising a plurality of associated clutches, including a driving clutch, a driving shaft for said clutches, connections operable to effect engagement and disengagement of said clutches, interdependently, successively and automatically, a starting key, a trip member, a normally effective clutch control member shiftable to release the driving clutch for operation, a second but normally ineffective clutch control member shiftable under control of said trip member, simultaneously with said first clutch control member, to position to disengage said driving clutch after a partial revolution thereof, a third clutch control member for another of the associated clutches, a normally idle locking member, and means to shift said locking member to latch said third clutch control member against displacement while said second normally ineffective clutch control member is in effective position to disengage the driving clutch.

17. A control for a clutch system comprising a plurality of associated clutches, including a driving clutch, a driving shaft for said clutches, connections operable to effect engagement and disengagement of said clutches, interdependently, successively and automatically, a starting key, a trip member, a normally effective clutch control member shiftable to release the driving clutch for operation, a second but normally ineffective clutch control member shiftable under control of said trip member, simultaneously with said first clutch control member, to position to disengage said driving clutch after a partial revolution thereof, a third clutch control member for another of the associated clutches, a normally idle locking member, and means to shift said locking member to latch said third clutch control member against displacement while said second normally ineffective clutch control member is in effective position to disengage the driving clutch, a control element on said driving clutch, a rocking member, and a spring link between said third clutch control member and the rocking member, said rocking member being controlled by said control element and said spring link.

18. A control for clutch systems comprising a plurality of associated clutches, including a driving clutch, a driving shaft for said clutches, connections operable to effect engagement and disengagement of said clutches, interdependently, successively and automatically, a starting key, a trip member, a normally effective clutch control member shiftable to release the driving clutch for operation, a second but normally ineffective clutch control member shiftable under control of said trip member, simultaneously with said first clutch control member, to position to disengage said driving clutch after a partial revolution thereof, a third clutch control member for another of the associated clutches, a normally idle locking member, and means to shift said locking member to latch said third clutch control member while said second normally ineffective clutch control member is in effective position to disengage the driving clutch, a control element on said driving clutch, a rocking bail member located adjacent said third clutch control member, and a spring link between the third clutch control member and said bail member, said bail member being operable in opposite directions by said control element and said spring link, respectively.

19. A control for clutch system comprising a plurality of associated clutches, including a driving clutch of the half turn type, a driving shaft for said clutches, connections operable to engage and disengage said clutches interdependently, automatically and successively, a starting key, a trip member, a normally effective clutch control member shiftable to release the driving clutch for operation, a second but normally ineffective clutch control member shiftable under control of the trip member synchronously with said first clutch control member as it releases the driving clutch, into position to disengage the driving clutch after a partial revolution, a normally effective third clutch control member for control of one of the remaining clutches, a normally idle locking member for said third clutch control member, means to shift said locking member into locking position relatively to said third clutch control member as said second clutch control member is shifted to its effective position relatively to the driving clutch, a shiftable member, a spring link connecting said third clutch control member, and said shiftable member, and a control element operable by the driving clutch to shift the shiftable member and tension the spring link during the first partial revolution of the driving clutch.

20. A control for clutches comprising a plurality of associated clutches, including a driving clutch of the half turn type, a driving shaft for said clutches, connections operable to engage and disengage said clutches interdependently, automatically and successively, a starting key, a trip member, a normally effective clutch control member shiftable to release the driving clutch for operation, a second but normally ineffective clutch control member shiftable under control of the trip member synchronously with said first clutch control member as it releases the driving clutch, into position to disengage the driving clutch after a partial revolution, a normally effective third clutch control member for control of one of the remaining clutches, a control element operable by said driving clutch, and a normally idle tappet on said second clutch control member connected with said third clutch control member and shiftable into position to be actuated by said control element as the second clutch control member shifts into its effective position, contact of the control element with the tappet being effective to disengage the third clutch control member to release its clutch for operation.

21. A control for clutches comprising a plurality of associated clutches, including a driving clutch of the half turn type, a drive shaft for said clutches, connections operable to effect engagement and disengagement of said clutches interdependently, automatically and successively, a starting key, a trip member, a normally effective clutch control member shiftable under control of the trip member, to release the driving clutch for operation, a second clutch control member shiftable under control of said trip member and synchronously with the release of the first clutch control member, to position to disengage said driving clutch after a partial rotation thereof, a locking mechanism interconnected between said second clutch control member and the slidable member, and including a rocking member and a pawl pivoted thereon, the pawl being displaceable by the trip member incident to its control of the second clutch control member, a cam driven by another of the clutches, and means governed by the cam to restore the pawl to effective position relatively to said second clutch control member.

22. A control for clutches comprising a plurality of associated clutches, including a driving clutch of the half turn type, a driving shaft for said clutches, connections operable to effect engagement and disengagement of said clutches interdependently, successively and automatically, a starting key, a trip member, a normally effective clutch control member for the driving clutch, a locking member therefor, a shiftable support for the locking member, means under control of the trip member to displace the locking member, means operable upon displacement of the locking member to release the driving clutch for operation, a second clutch control member likewise shiftable under control of the trip member and synchronously with the release of the first clutch control member, to position to disengage said driving clutch after a partial rotation thereof, and means driven by another of the clutches to reestablish the effective connection between the locking member and said first clutch control member and to restore said first clutch control member to position to disengage the driving clutch at the completion of a cycle of rotation.

23. A control for clutches comprising a plurality of associated clutches, including a driving clutch of the half turn type, a driving shaft for said clutches, connections operable to engage and disengage said clutches interdependently, automatically and successively, a starting key, a trip member, a normally effective clutch control member shiftable to release the driving clutch for operation, a second but normally ineffective clutch control member shiftable under control of the trip member synchronously with said first clutch control member as it releases the driving clutch, into position to disengage the driving clutch after a partial revolution, and a cam operable by another of the clutches to restore said second clutch control member to its normal ineffective position to release the driving clutch for completion of a cycle of rotation.

24. A control for clutches comprising a plurality of associated clutches, including a driving clutch of the half turn type, a driving shaft for said clutches, connections operable to engage and disengage said clutches interdependently, automatically and successively, a starting key, a trip member, a normally effective clutch control member shiftable to release the driving clutch for operation, a second but normally ineffective clutch control member shiftable under control of the trip member synchronously with said first clutch control member as it releases the driving clutch, into position to disengage the driving clutch after a partial revolution, a cam operable by another of the clutches to restore said second clutch control member to its normal ineffective position to release the driving clutch for completion of a cycle of rotation, a normally effective third clutch control member appertinent to a second clutch, means to lock said third clutch control member in its effective position, a spring link connected with said third clutch control member to shift it to ineffective position releasing said second clutch for operation, and means operable incident to the disengagement of the second clutch control member from the driving clutch to displace said locking means for the third clutch control member, whereupon the spring link disconnects the third clutch control member from said second clutch to free the latter for operation.

25. A control for a clutch system comprising a plurality of associated clutches including a driving clutch of the half turn type, a driving shaft for the clutches, connections operable to effect engagement and disengagement of said clutches interdependently, successively and automatically, a starting key, a trip member, a normally effective clutch control member shiftable to release the driving clutch, a second normally ineffective clutch control member shiftable under control of said trip member synchronously with the release of the driving clutch by the first clutch control member, to position to disengage the driving clutch prior to the completion of a full cycle, means operable by a second one of said clutches to shift said second clutch control member to its ineffective position, to enable the driving clutch to complete a full cycle of rotation, a normally effective third clutch control member appertinent to a third one of said clutches, means to shift said third clutch control member to its idle position, means to lock said third clutch control member in its effective position against the action of said shifting means, means operable incident to the shifting of said second clutch control member to its ineffective position, to displace said locking means for the third clutch control member, thereby freeing said third clutch control member to the action of said shifting means, and means to restore said third clutch control member to its effective position to disengage said second clutch from its drive shaft subsequently to the completion by the driving clutch of a full cycle of rotation.

26. A control for a clutch system comprising a plurality of associated clutches including a driving clutch, a driving shaft with which said clutches engage and disengage, connections operable to effect such engagement and disengagement interdependently, successively and automatically, a trip member, a normally effective clutch control member shiftable under control of the trip member to release the driving clutch, a second normally ineffective clutch control member shiftable synchronously with the release of the driving clutch by the first clutch control member, to a position to disengage the driving clutch prior to its completion of a full cycle, a normally effective third clutch control member for a second of said clutches, means operable by said second clutch to restore said second clutch control member to its ineffective position, to enable the driving clutch to complete a full cycle of rotation, means operable by the driving clutch to shift said third clutch control member to idle position whereby to free said second clutch for a complete cycle while the drive clutch is arrested intermediate the ends of its cycle, a fourth normally effective clutch control member associated with a third clutch, means operable by said driving clutch to shift the fourth clutch control member to ineffective position to free the third clutch for operation, and means controlled by said second clutch control member to delay the operation of said shifting means for the fourth clutch control member until said second clutch control member is shifted to release the driving clutch for operation.

27. In a clutch system, the combination with a plurality of associated clutches including a drive clutch, and a driving shaft for said clutches, of means operable to effect engagement and disengagement of said clutches interdependently, automatically and successively, a trip member, a normally effective clutch control member operable under control of the trip member to release the driving clutch for operation, a second normally ineffective clutch control member shiftable under control of said trip member to position to disengage the driving clutch prior to the completion of its cycle of rotation, a third normally effective clutch control member for a second clutch, means operable by the driving clutch just prior to its arrest in partially rotated position, to trip said third clutch control member to release the second clutch for operation, means operable by the second clutch to restore the second clutch control member to ineffective position, thereby freeing the driving clutch to enable it to complete its rotation, a normally effective fourth clutch control member for a third one of said clutches, temporarily effective delayed action means operable by said driving clutch and controlled by said second clutch control member to shift said fourth clutch control member to ineffective position to free said third clutch for operation, and means settable under control of the second clutch and operable by said driving clutch to restore the first clutch control member to position to disengage the driving clutch at the end of its cycle of rotation.

28. In a drive for machines equipped with mechanisms designed for operation in timed relation, the combination with a plurality of clutches, each of which is effective to operate its respective mechanism; a power-operated driving shaft for said clutches; means to normally retain said clutches idle; and means operable at will to release one of said clutches for operation; of control means between the respective clutches, including an auxiliary means to arrest said clutch first released, one of said control means operable by the clutch first-released, to release a second clutch for operation; and another of said control means operable by said second-released clutch after an interval of time to disengage the auxiliary arresting means from its clutch to enable said clutch to resume rotation.

29. In a drive for machines equipped with mechanisms designed for operation in timed relation, the combination with a plurality of clutches, each of which is effective to operate its respective mechanism; a power-operated driving shaft for said clutches; means to normally retain said clutches idle; and means operable at will to release one of said clutches for operation; of control means between the respective clutches, including an auxiliary means to arrest said clutch first released, one of said control means operable by the clutch first-released, to release a second clutch for operation; another of said control means operable by said second-released clutch after an interval of time to release the clutch first released from its auxiliary arresting means; and a further control means conditioned for operation by said clutch first released and operable by said second released clutch to release a third clutch for operation substantially simultaneously with the second release of the first mentioned clutch.

30. A clutch system for driving the mechanisms of adding and similar machines, including an actuator clutch, a tens transfer clutch and a printing clutch; a drive shaft therefor; a series of clutch control levers interdependent upon the clutches to effect the automatic engagement and disengagement of said clutches with the drive shaft in predetermined timed relation; a manipulative member; and means operable thereby to initiate the engagement of the actuator clutch with said drive shaft to start the automatic functioning of the train of clutches, said means being operable also by the actuator clutch to effect the disengagement of said clutch from the drive shaft.

31. A clutch system for driving the mechanisms of adding and similar machines, including an actuator clutch, a tens transfer clutch and a printing clutch; a drive shaft therefor; a series of clutch control levers interdependent upon the clutches to effect the automatic engagement and disengagement of said clutches with the drive shaft in predetermined timed relation; a manipulative member; means operable thereby to initiate the engagement of the actuator clutch with said drive shaft to start the automatic functioning of the train of clutches, said means being operable also by the actuator clutch to effect the disengagement of said clutch from the drive shaft, said last-named means including a clutch control member; a support mounted co-axially with said clutch control member; and a spring-actuated rockable member on said support.

32. A clutch system for driving the mechanisms of adding and similar machines, including an actuator clutch, a tens transfer clutch and a printing clutch; a drive shaft therefor; a series of clutch control levers interdependent upon the clutches to effect the automatic engagement and disengagement of said clutches with the drive shaft in predetermined timed relation; a manipulative member; means operable thereby to initiate the engagement of the actuator clutch with said drive shaft to start the automatic functioning of the train of clutches, said means being operable also by the actuator clutch to effect the disengagement of said clutch from the drive shaft, said last-named means including a clutch control member; a rock shaft to which the clutch control member is fixed; a support journaled on the rock shaft; and a spring-actuated member pivoted on said support.

33. A clutch system for driving the mechanisms of adding and similar machines, including an actuator clutch, a tens transfer clutch and a printing clutch; a drive shaft therefor; a series of clutch control levers interdependent upon the clutches to effect the automatic engagement and disengagement of said clutches with the drive shaft in predetermined timed relation; a manipulative member; means operable thereby to initiate the engagement of the actuator clutch with said drive shaft to start the automatic functioning of the train of clutches, said means being operable also by the actuator clutch to effect the disengagement of said clutch from the drive shaft; a cam operable by said actuator clutch; said last-named means including a clutch control member; a suitably mounted rocking support operable by said cam; and a spring-actuated member pivoted on said support.

34. A clutch system for driving the mechanisms of adding and similar machines, including an actuator clutch, a tens transfer clutch and a printing clutch; a drive shaft therefor; a series of clutch control levers interdependent upon the clutches to effect the automatic engagement and disengagement of said clutches with the drive shaft in predetermined timed relation; a manipulative member; means operable thereby to initiate the engagement of the actuator clutch with said drive shaft to start the automatic functioning of the train of clutches, said means being operable also by the actuator clutch to effect the disengagement of said clutch from the drive shaft, said last-named means including a clutch control member; a suitably mounted rocking support; a spring-actuated member pivotally mounted on the support and engageable and disengageable relatively to the clutch control member; a slidably and rockably supported member operable by the manipulative member; and means to establish a loose driving connection between the spring-actuated pivoted member and said slidable and rockable member to release the spring-actuated pivoted member from the clutch control member.

35. In a machine of the class described, the combination with a plurality of clutches; and means to drive said clutches; of means to normally maintain the driven members of said clutches disengaged from the driving means; clutch-operated reciprocally co-related controls between certain of said clutch disengaging means to render the interdependent clutches sequentially ineffective and effective according to a predetermined order; and means to initiate the sequential operation of the clutches.

36. In a machine of the class described, the combination with a train of clutch mechanisms, including clutch control levers for the respective clutch mechanisms to normally retain the individual clutch mechanisms ineffective; and driving means for the clutch mechanisms; of means to trip one of said clutch control levers to enable its associated clutch mechanisms to become effective; means operable by said tripped clutch mechanism to trip a second clutch control lever to enable a second clutch mechanism to become effective; and means operable by said last-named clutch mechanism to initiate the restoration to clutch-disengaging position of the clutch control lever associated with said first-tripped clutch mechanism.

37. In a machine of the class described, the combination with a plurality of clutches; and drive means therefor; of means to connect the driven members of said clutches sequentially with the drive shaft and to sequentially disconnect said driven clutch members from the drive means, including clutch detent members to normally maintain said driven members disconnected from the drive means; means to release one of said clutch detents to enable the corresponding clutch member to be actuated by said drive means; and means controlled by the respective clutches and interconnecting the respective clutch detent members to enable the clutch first operated to trip a second clutch for operation, which second clutch trips a third clutch for operation; means conditioned by the means which releases the first-named clutch for operation to arrest said first-named clutch at an intermediate point short of a complete rotation, said last-named means operable by the second-named clutch to again release said first-named clutch to enable it to complete a single rotation.

AUGUST FRIEDRICH POTT.